United States Patent [19]

Imanari et al.

[11] Patent Number: 5,734,935
[45] Date of Patent: Mar. 31, 1998

[54] CAMERA SYSTEM AND INTERMEDIATE ADAPTER

[75] Inventors: Hitoshi Imanari, Yokohama; Yuji Ihara, Tokyo; Hiroshi Tanioka, Kashiwa, all of Japan

[73] Assignee: Nikon Corporation, Tokyo, Japan

[21] Appl. No.: 725,954

[22] Filed: Oct. 7, 1996

[30] Foreign Application Priority Data

| Oct. 13, 1995 | [JP] | Japan | 7-265612 |
| Jan. 8, 1996 | [JP] | Japan | 8-000435 |
| Aug. 29, 1996 | [JP] | Japan | 8-228191 |
| Aug. 29, 1996 | [JP] | Japan | 8-228216 |

[51] Int. Cl.⁶ .................................. G03B 17/14
[52] U.S. Cl. .................. 396/71; 396/529; 396/530
[58] Field of Search .................. 396/71, 529–533, 396/435, 436

[56] References Cited

U.S. PATENT DOCUMENTS

| 4,199,248 | 4/1980 | Schlapp et al. | 396/531 |
| 4,812,865 | 3/1989 | Ueyama | 396/530 |
| 5,570,153 | 10/1996 | Shono | 396/531 |

*Primary Examiner*—W. B. Perkey

[57] ABSTRACT

The mounting of an interchangeable lens having a predetermined or lesser back focus and an intermediate adapter is limited by camera bodies and the intermediate adapters. A camera system has two kinds of bodies having metal backs of the same dimension and body side mounts of the same shape, a plurality of interchangeable lenses having a common lens side mount engageable with the body side mounts, and a plurality of intermediate adapters between the interchangeable lenses and the camera bodies. The first body has an escape portion in the body side mount over the mounting range of the interchangeable lenses or the intermediate adapters so that the mounting of all the interchangeable lenses and all the intermediate adapters may be possible. The second body has a flange portion in the body side mount so that the mounting of an interchangeable lens having a predetermined or greater back focus and an intermediate adapter mountable only on this interchangeable lens may be possible.

21 Claims, 20 Drawing Sheets

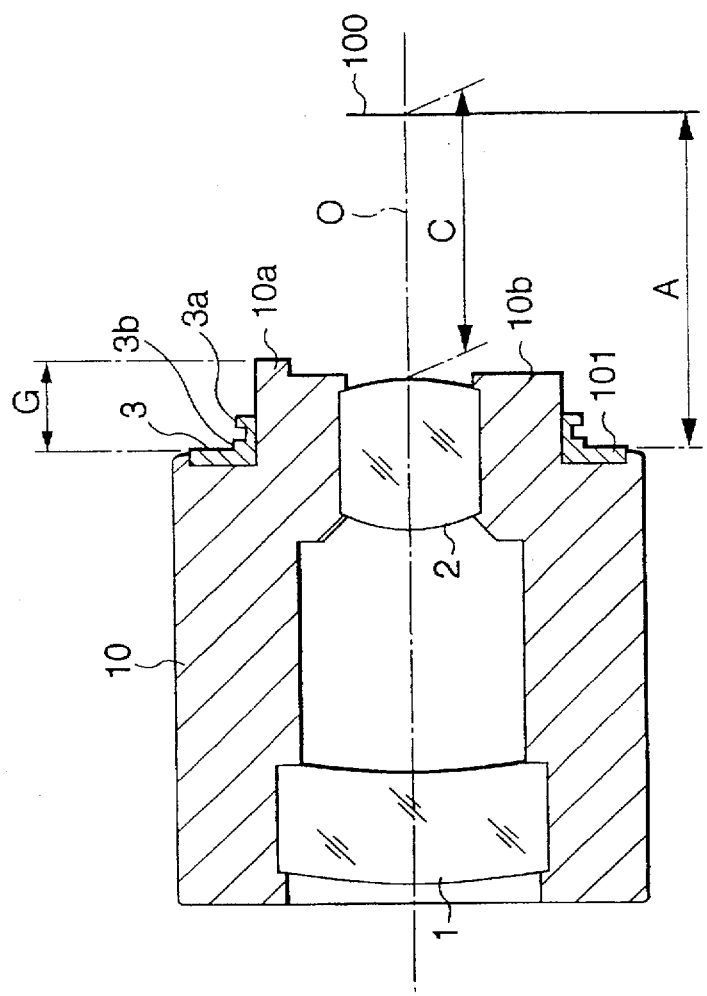
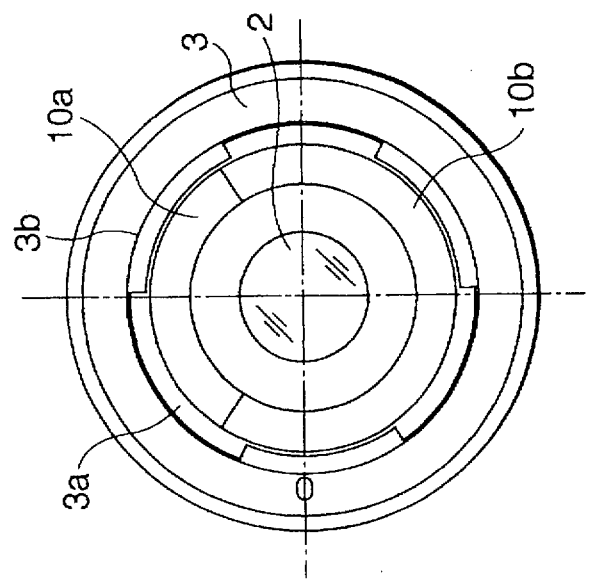
FIG. 13A
FIG. 13B

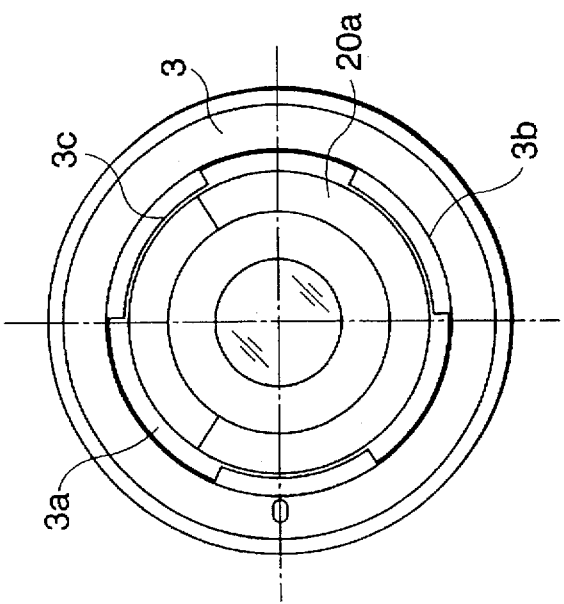
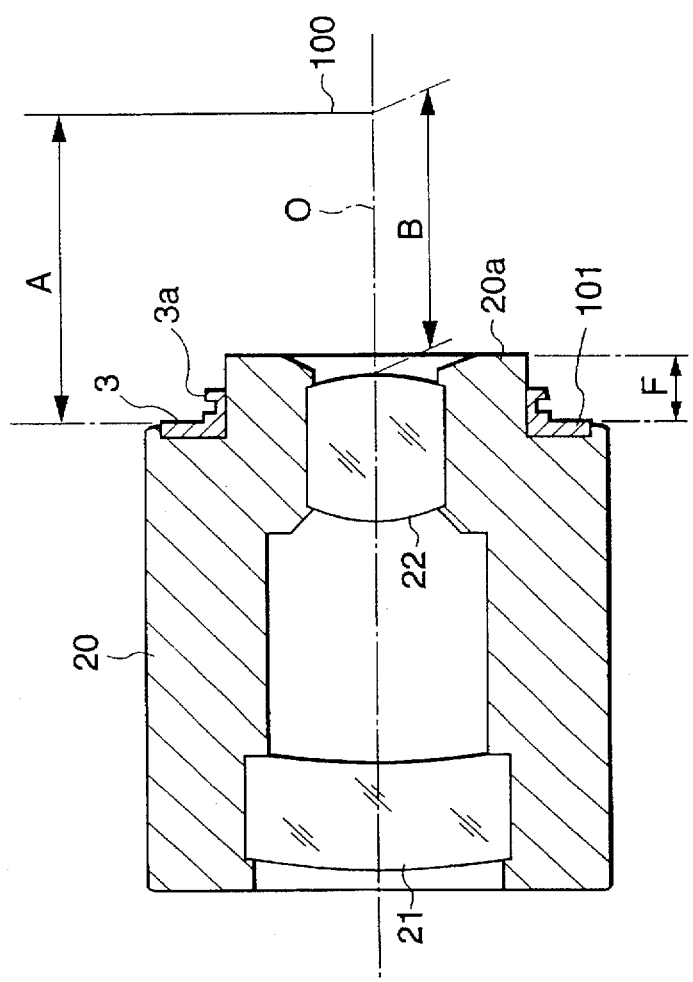
FIG. 14A
FIG. 14B

CAMERA SYSTEM AND INTERMEDIATE ADAPTER

BACKGROUND OF THE INVENTION

1. Field of the Invention

This invention relates to a camera system and an intermediate adapter in which in a camera body, an interchangeable lens and an intermediate adapter having one and the same mount, the mounting of an interchangeable lens having a predetermined or smaller back focus or the intermediate adapter is limited by the intermediate adapter or the camera body.

2. Related Background Art

When the shapes of the mounts of a camera body and an interchangeable lens are common to each other, a camera system of this kind permits the mounting of the interchangeable lens and the camera body even when the back focus of the interchangeable lens differs.

Although rare, in the case of a wide system interchangeable lens or the like, the back focus thereof is short and the rear end portion of the interchangeable lens sometimes strikes against the mirror of the camera body, and it is usual to lift the mirror to thereby make the interchangeable lens usable.

Also, in such a camera system, it has sometimes been the case that the mount itself is renewed to make the most of the characteristic of the interchangeable lens.

On the other hand, Japanese Laid-Open Utility Model Application No. 5-25435 discloses a camera system in which even if the basic shapes of mounts are substantially common to each other, a projection and a cut-away are provided on the mutual bayonet pawls of an intermediate adapter and a mountable interchangeable lens.

Also, Japanese Laid-Open Patent Application No. 63-48539 discloses an example provided with hindering means for hindering the mounting of an intermediate optical apparatus onto any other interchangeable lens than a particular interchangeable lens.

In the above-described prior art, however, even if the back focus of the camera body is short (e.g. of the order of 38 mm from a film surface), when the interchangeable lens is mountable and strikes against the mirror of the camera, it results in the danger of damaging the mirror of the camera by the carelessness of a photographer for the photographer to lift the mirror and use the camera, and photographing itself is limited.

On the other hand, it wastes the prior-art camera system to change the conventional mount itself including the position of a metal back in order to prepare a number of interchangeable lenses having a short back focus (e.g. of the order of 30 mm–38 mm) due to the convenience of the manufacturer and therefore this is greatly disadvantageous to both of users who have kept a rich assortment of conventional systems in stock and manufacturers.

The device of Japanese Laid-Open Utility Model Application No. 5-25435, when a projection and a cut-away are provided on the mutual bayonet mount pawls of an intermediate adapter and a mountable interchangeable lens, can cope by partly changing the shapes of both mounts at a time because of the relation that the mounting of the intermediate adapter and a particular lens are mountable or not.

However, in the case of a camera body and an interchangeable lens, when the basic shapes of the mounts thereof are the same, it is difficult to permit every interchangeable lens to be mounted on a novel camera body and not to permit only a particular lens to be mounted on an old camera body.

Also, in Japanese Laid-Open Patent Application No. 63-48539, provision is made of the hindering means for hindering the mounting of an intermediate optical apparatus onto any other interchangeable lens than a particular interchangeable lens and therefore, it is possible to limit the mounting of the interchangeable lens and the intermediate optical apparatus, but there is not disclosed the structure of the mountability or non-mountability of the intermediate optical apparatus and the camera body, and there is not described even the necessity thereof.

SUMMARY OF THE INVENTION

To solve the drawbacks mentioned above, the present invention is a camera system having first and second camera bodies (30, 40) of which the metal backs from a mount reference surface to a film surface are of the same dimension and the body side mounts are of the same shape, and a plurality of interchangeable lens units (10, 20) having a common lens side mount engageable with the body side mounts, characterized in that the first camera body (30) has an escape portion (131a) over the mounting range of the interchangeable lens units in the interior of the body side mount so that the mounting of all the interchangeable lens units may be possible, and the second camera body (40) is provided with a flange portion (141a) in the interior of the body side mount so that only an interchangeable lens unit having a back focus of a predetermined or larger dimension may be mountable.

The present invention further includes an interchangeable lens unit having a back focus of a predetermined or smaller dimension and provided with a fixed member for interfering with the flange portion in the body side mount when an attempt is made to mount the interchangeable lens unit on the second camera body, and hampering mount coupling.

The invention is further characterized in that the fixed member is a fixed projection provided between the lens side mount and an optical system.

The invention is further characterized in that the fixed projection is a protective member for protecting a lens side electrical contact (50) connected to a body side electrical contact provided on the body side mount.

The invention is further characterized in that the protective member is provided with shock absorbing portions (10c, 10d) for absorbing the shock of the contact with a constituent member on the first or second camera body side when the interchangeable lens units are mounted on the first or second camera body.

Another embodiment of the invention is a camera body for use in a camera system having a plurality of camera bodies of which the metal backs from a mount reference surface to a film surface are of the same dimension and the body side mounts are of the same shape, and a plurality of interchangeable lens units having a common lens side mount engaged with the body side mounts, characterized in that the interior of the body side mounts has an escape portion over the mounting range of the interchangeable lens units so that the mounting of all the interchangeable lens units may be possible.

Another embodiment is an interchangeable lens for use in a camera system having a plurality of camera bodies of which the metal backs from a mount reference surface to a film surface are of the same dimension and the body side mounts are of the same shape, and a plurality of interchangeable lens units having a common lens side mount engaged with the body side mounts, characterized by the provision of a fixed member having a predetermined or smaller back focus and adapted to interfere with a flange portion provided in the body side mounts to thereby hamper mount coupling when an attempt is made to mount an interchangeable lens unit having a predetermined or back focus and provided with the flange portion on a camera body on which only the interchangeable lens unit is mountable.

The invention is further characterized in that the fixed member is a fixed projection provided between the lens side mount and an optical system.

The invention is further characterized in that the fixed projection is a protective member for protecting a lens side electrical contact connected to a body side electrical contact provided on the body side mounts.

The invention is further characterized in that the protective member is provided with a shock absorbing portion for absorbing the shock of the contact with a constituent member on the first or second camera body side when the interchangeable lens is mounted on the first or second camera body.

Another embodiment of the present invention is a camera system having first and second camera bodies of which the metal backs from a mount reference surface to a film surface are of the same dimension and the body side mounts are of the same shape, a plurality of interchangeable lenses having a common lens side mount engaged with the body side mounts, and a plurality of intermediate adapters connected between the camera bodies and the interchangeable lenses, characterized in that the first camera body has an escape portion in the body side mount over the mounting range of the interchangeable lenses or the intermediate adapters so that the mounting of all the interchangeable lenses and all the intermediate adapters may be possible, and the second camera body has a flange portion in the body side mount so that the mounting of an interchangeable lens having a predetermined or greater back focus and the mounting of an intermediate adapter mountable only on the interchangeable lens may be possible.

The invention is further characterized by including an intermediate adapter mountable on all the interchangeable lenses and provided with a fixed member adapted to interfere with the flange portion in the body side mount during mount mounting to thereby hamper mount coupling when an attempt is made to mount the interchangeable lenses on the second camera body.

The invention is further characterized in that the fixed member is a fixed projection provided on the inner diameter side of the body coupling mount of the intermediate adapter.

The invention is further characterized in that the fixed projection is a protective member for protecting an intermediate adapter side electrical contact (150) connected to a body side electrical contact provided on the body side mount.

The invention of if further characterized in that the protective member is provided with shock absorbing portions (50e, 50d) for absorbing the shock of the contact with a constituent member on the camera body side when the intermediate adapter is mounted on the camera body.

Another embodiment of the present invention is an intermediate adapter for use in a camera system including a second camera body having a flange portion in a body side mount so as to be mountable only on an interchangeable lens having a predetermined or greater back focus, characterized in that it is mountable on all interchangeable lenses, and is provided with a fixed member adapted to interfere with the flange portion in the body side mount to thereby hamper mount coupling when an attempt is made to mount the intermediate adapter on the second camera body.

The invention according to this embodiment is a teleconverter having an optical system.

The invention is further characterized in that the fixed member is a fixed projection provided between the lens side mount and an optical system.

The invention is further characterized in that the fixed projection is a protective member for protecting an intermediate adapter side electrical contact connected to a body side electrical contact provided on the body side mount.

The invention is further characterized in that the protective member is provided with a shock absorbing portion for absorbing the shock of the contact with a constituent member on the first or second camera body side when the intermediate adapter is mounted on the first or second camera body.

BRIEF DESCRIPTION OF THE DRAWINGS

FIGS. 13A and 13B are cross-sectional views showing the first interchangeable lens according to the embodiment.

FIGS. 14A and 14B are cross-sectional views showing the second interchangeable lens according to the embodiment.

DESCRIPTION OF THE PREFERRED EMBODIMENTS

Figure 1:
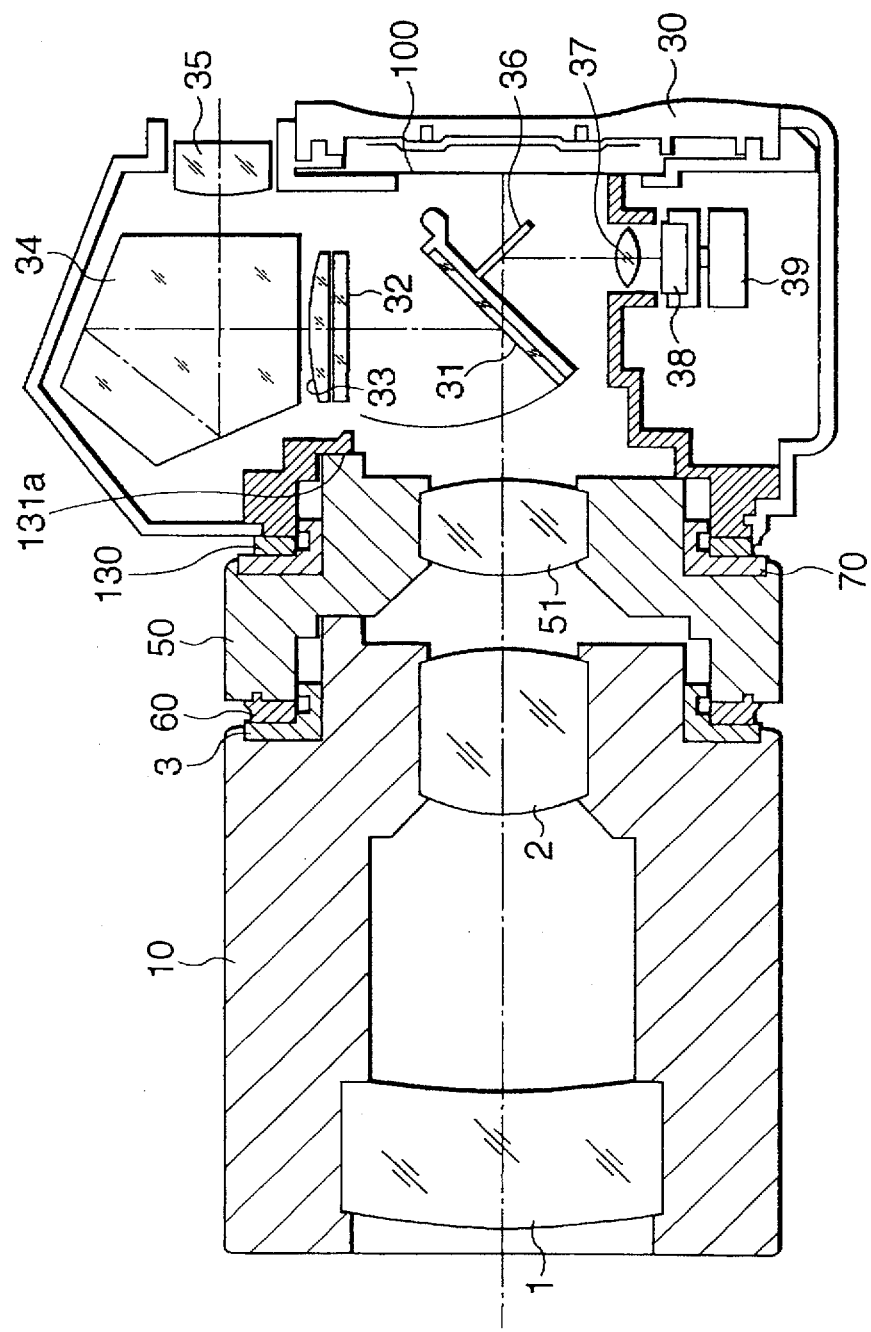
FIG. 1 is a cross-sectional view showing a case where a first camera body, a first intermediate adapter and a first interchangeable lens according to an embodiment of the present invention are coupled together.

The invention will hereinafter be described in detail with reference to the accompanying drawings.
(Camera System)

FIGS. 1 to 12 are cross-sectional views showing the essential portions of an embodiment of a camera system according to the present invention.

FIGS. 13A to 14B are cross-sectional views showing first and second interchangeable lenses, respectively, according to the present embodiment. FIGS. 15A to 16B are cross-sectional views showing first and second camera bodies, respectively, according to the present embodiment. FIGS. 17A to 18C are cross-sectional views showing first and second intermediate adapters according to the present embodiment.

The camera system according to the present embodiment includes first and second interchangeable lenses 10 and 20, first and second camera bodies 30 and 40, and first and second intermediate adapters 50 and 80.

The first interchangeable lens 10 is a lens of a short back focus (a back focus of the order of 30 mm–38 mm) (see FIGS. 1, 3, 5, 7, 9, 11, 13A and 13B).

The second interchangeable lens 20 is a lens of a long back focus (a back focus of 38 mm or more) (see FIGS. 2, 4, 6, 8, 10, 12, 14A and 14B).

The first camera body 30 is a body on which the first and second interchangeable lenses 10 and 20 and the first and second intermediate adapters 50 and 80 are mountable (see FIGS. 1 to 4, 9, 10, 15A and 15B).

The second camera body 40 is a body on which only the second interchangeable lens 20 having a predetermined or greater back focus and the second intermediate adapter 80 mountable only on this interchangeable lens 20 are mountable (see FIGS. 4 to 8, 11, 12, 16A and 16B).

The first intermediate adapter 50 is an adapter on which the first and second interchangeable lenses 10 and 20 are mountable (see FIGS. 1, 2, 5, 6, 17A, 17B and 17C).

The second intermediate adapter 80 is an adapter mountable only on the second interchangeable lens 20 having a predetermined or greater back focus (see FIGS. 3, 4, 7, 8, 18A, 18B and 18C).

Description will hereinafter be made of the detailed structure of the first and second interchangeable lenses 10 and 20, the first and second camera bodies 30 and 40, and the first and second intermediate adapters 50 and 80.
(First interchangeable Lens)

FIG. 13A is a cross-sectional view schematically showing the interchangeable lens 10 of a short back focus C (a back focus of the order of 30 mm–38 mm).

The interchangeable lens 10 has optical systems 1 and 2 in the lens barrel thereof. A metal back A is the distance from a film surface 100 to a mount reference surface 101. G designates the distance between the rear end portion 10a of the lens and the mount reference surface 101.

FIG. 13B is a view of the interchangeable lens 10 as it is seen from the rear of a lens side mount 3. The lens side mount 3 comprises bayonet mount pawl portions 3a and mount opening portions 3b disposed alternately. The lens side mount 3 is provided with a fixed projection 10a between the inner diameter side thereof and the optical system 2 so as to interfere with the flat flange portion 141a (see FIGS. 16A and 16B) of the second camera body 40 during mount mounting. Also, the lens side mount 3 is provided with a flat portion 10b between the inner diameter side thereof and the optical system 2 and at a location lower by a step than the fixed projection 10a.
(Second Interchangeable Lens)

FIG. 14A is a cross-sectional view schematically showing the interchangeable lens 20 of a long back focus B (a back focus of the order of 38 mm or greater).

The interchangeable lens 20 has optical systems 21 and 22 in the lens barrel thereof. A metal back A is of the same length as that of the interchangeable lens 10. F denotes the distance between the rear end portion 20a of the lens and a mount reference surface 101.

FIG. 14B is a view of the interchangeable lens 20 as it is seen from the rear of a lens side mount 3. The lens side mount 3 comprises bayonet mount pawl portions 3a and mount opening portions 3b disposed alternately, and is of the same shape as the mount of the interchangeable lens 10.
(First Camera Body)

Figure 15B:
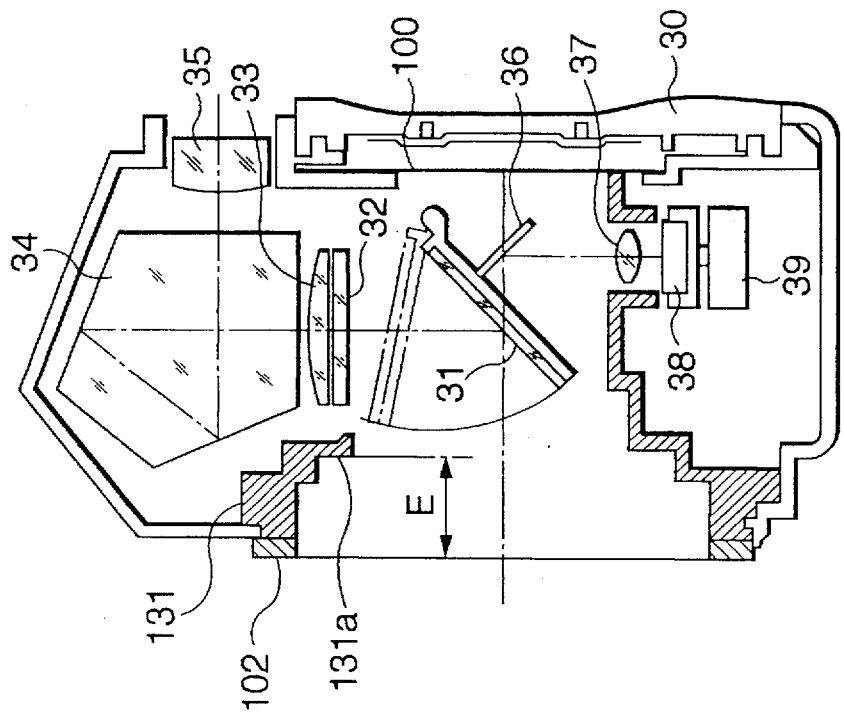
FIGS. 15A and 15B are cross-sectional views showing the first camera body according to the embodiment.
Figure 15A:
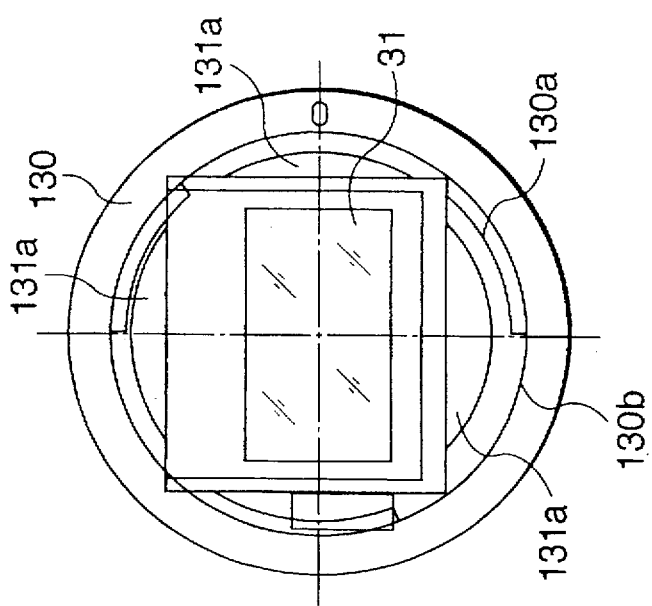

FIGS. 15A and 15B are cross-sectional views showing the first camera body 30. The first camera body 30 is provided with a body side mount 130. The body side mount 130 comprises bayonet mount pawl portions 130a and mount opening portions 130b disposed alternately, and the shape thereof is the same as that of the body side mount 140 of the second camera body 40. The first camera body 30 also corresponds to the interchangeable lens of a shorter back focus than the second camera body 40 which will be described later and therefore, as compared with the second body 40, the shape of a mirror 31 is somewhat small and the mirror is close to a film surface 100.

The body side mount 130 has on the rear portion thereof a fixed portion serving also as the mirror box 131 of the camera body 30, and as shown in FIG. 15A, a flange portion 131a is formed around the mirror 31. This flange portion 131a is a portion adapted to avoid the projected portion of the inner diameter portion of the lens side mount during lens mounting in order to avoid the interference with that portion of the interchangeable lens 10 of a short back focus which is rear from the lens side mount 3.

E designates the dimension from a body mount reference surface 102 to a flange portion 131a. The focus of the mirror 31 is such that it passes through the film surface side from the flange portion 131a.
(Second Camera Body)

Figure 16B:
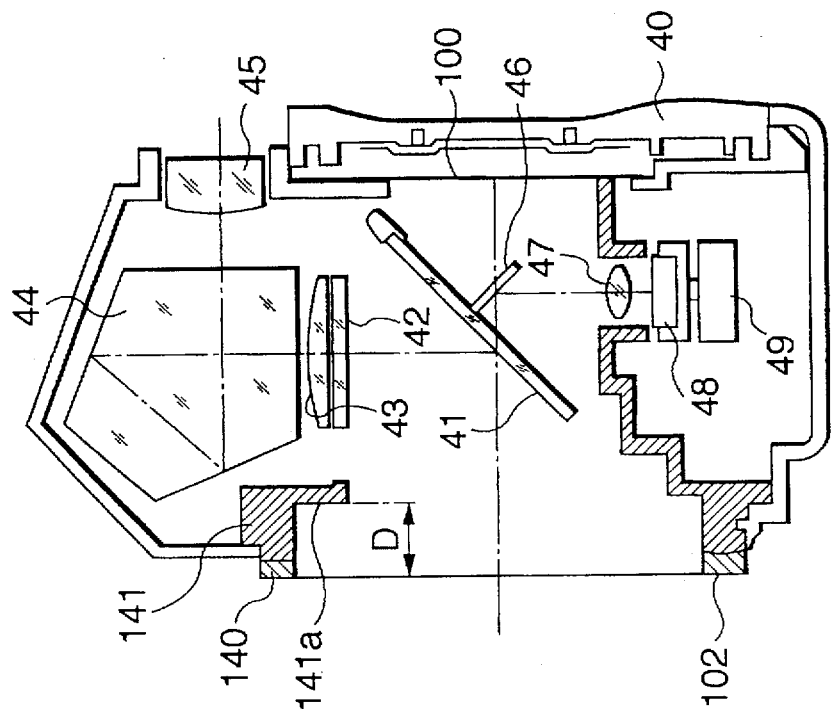
FIGS. 16A and 16B are cross-sectional views showing the second camera body according to the embodiment.
Figure 16A:
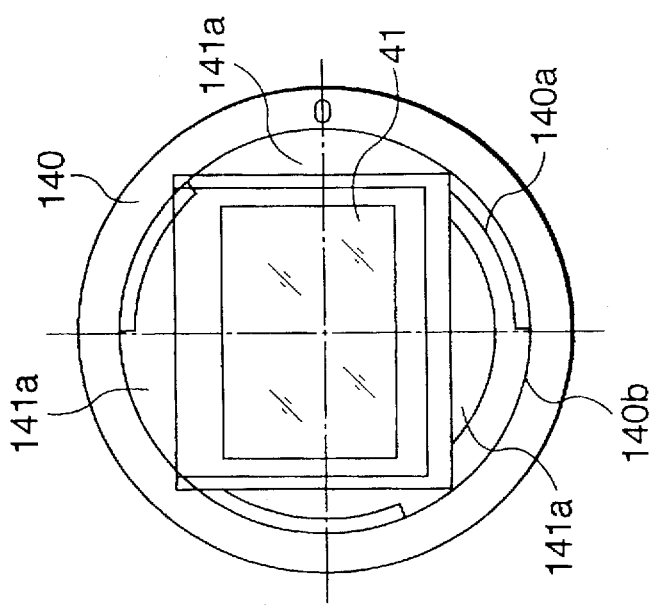

FIGS. 16A and 16B are cross-sectional views showing the second camera body 40.

The second camera body 40 is provided with a body side mount 140. The body side mount 140 comprises bayonet mount pawl portions 140a and mount opening portions 140b disposed alternately.

The body side mount 140 has on the rear portion thereof a fixed portion serving also as the mirror box 141 of the body, and as shown in FIG. 16A, a flat flange portion 141a is formed on the right and upper portion of a mirror 41. D denotes the dimension from a mount reference surface 102 to the flat flange portion 141a. The locus of a mirror 41 is such that it passes through the film surface side from the flat portion 141a.

(First Intermediate Adapter)

Figure 17C:
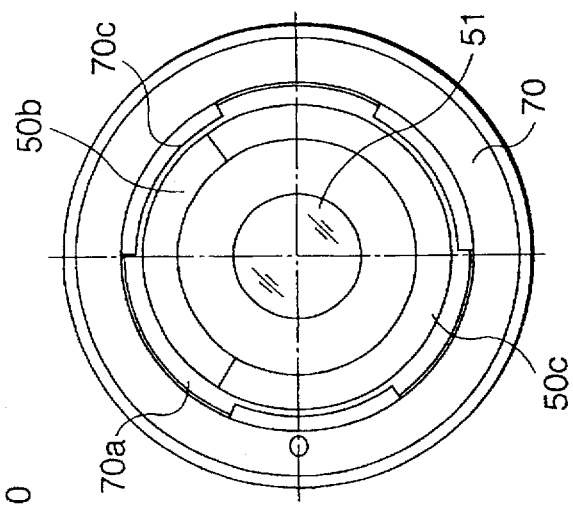
FIGS. 17A to 17C are cross-sectional views showing the first intermediate adapter according to the embodiment.
Figure 17B:
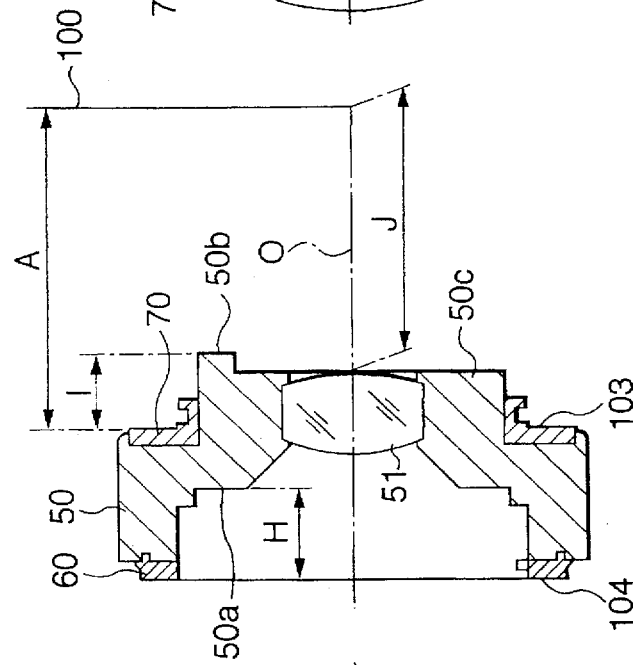
Figure 17A:
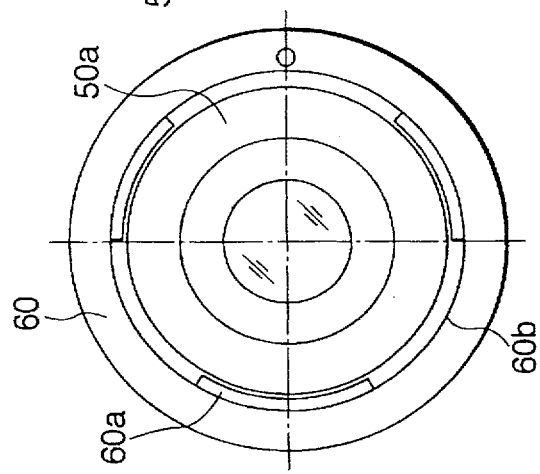

FIGS. 17A to 17C are cross-sectional views showing the first intermediate adapter 50 according to the present embodiment.

The first intermediate adapter 50 is an adapter on which all the interchangeable lenses are mountable, and in the present embodiment, it has an optical system in the lens barrel and is used as a tele-converter for enlarging the focal length of the lens.

The intermediate adapter 50 is provided with a body coupling mount 70 to be mounted on the camera body on the body side of the body, and is provided with a lens coupling mount 60 to be mounted on the interchangeable lens on the opposite side of the adapter. The back focus J of this intermediate adapter 50 is short (a back focus of the order of 30 mm–38 mm) so that all the interchangeable lenses are mountable thereon. Here, the distance A from the film surface 100 to a mount reference surface 103 is referred to as the metal back. Also, the distance between the rear end portion 50b of the lens and the mount reference surface 103 is defined as I.

FIG. 17A is a view of the first intermediate adapter 50 as it is seen from the front thereof. A lens coupling mount 60 comprises bayonet mount pawl portions 60a and mount opening portions 60b disposed alternately. There is a flange portion 50a on the rear of the mount 60, and the dimension from a mount reference surface 104 to the flange portion 50a is defined as H.

FIG. 17C is a view of the first intermediate adapter 50 as it is seen from the rear thereof. A body coupling mount 70 comprises bayonet mount pawl portions 70a and mount opening portions 70c disposed alternately. The body coupling mount 70 is provided with a fixed projection 50b between the inner diameter side thereof and an optical system 51 so as to interfere with the flat flange portion 141a (see FIGS. 16A and 16B) of the second camera body 40 during mount mounting. Also, the body coupling mount 70 is provided with a flat portion 50c between the inner diameter side thereof and the optical system 51 and at a location lower by a step than the fixed projection 50b.

(Second intermediate Adapter)

Figure 18C:
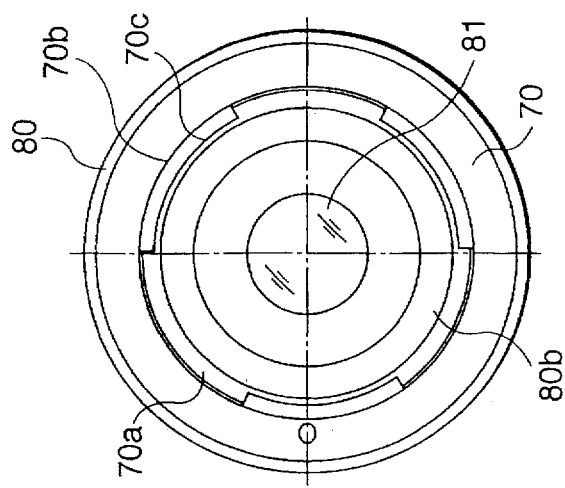
FIGS. 18A to 18C are cross-sectional views showing the second intermediate adapter according to the embodiment.
Figure 18B:
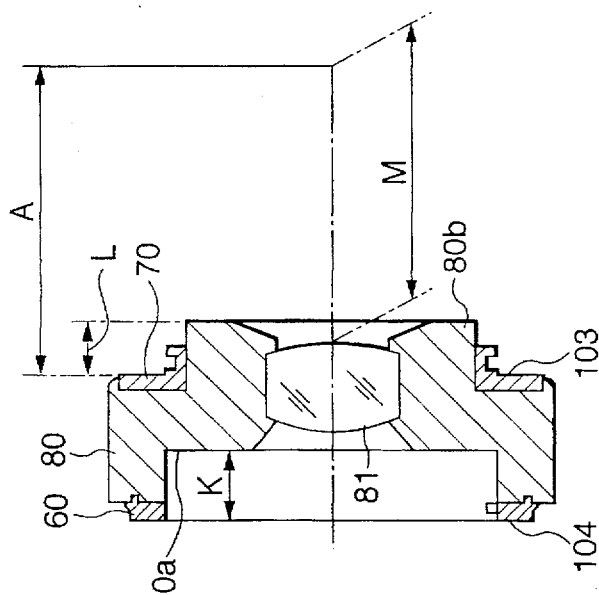
Figure 18A:
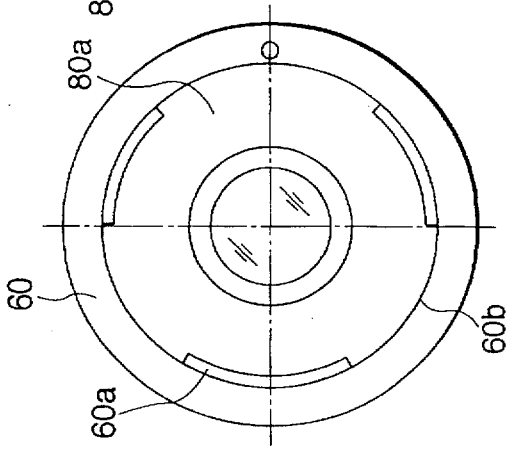

FIGS. 18A to 18C are cross-sectional views showing the second intermediate adapter 80 according to the present embodiment. The second intermediate adapter 80 is an adapter mountable only on an interchangeable lens having a predetermined or greater back focus, and in the present embodiment, it has an optical system 81 in the barrel thereof and is used as a tele-converter for enlarging the focal length of the lens.

The intermediate adapter 80 is provided with a body coupling mount 70 to be mounted on the camera body on the body side of the body, and is provided with a lens coupling mount 60 to be mounted on the interchangeable lens on the opposite side. In the intermediate adapter 80, a back focus M is long (a back focus of the order of 38 mm or greater) so that an interchangeable lens having a predetermined or greater back focus is mountable thereon. Here, the metal back is the same metal back A as that of the aforedescribed intermediate adapter 50. Also, the distance between the rear end portion 80b of the lens and the mount reference surface 103 is defined as L.

FIG. 18A is a view of the second adapter 80 as it is seen from the front thereof. The lens coupling mount 60 comprises bayonet mount pawl portions 60a and mount opening portions 60b disposed alternately. There is a flange portion 80a on the rear of the mount 60, and the dimension from a mount reference surface 104 to the flange portion 80a is defined as K.

FIG. 18C is a view of the second adapter 80 as it is seen from the rear thereof.

The body coupling mount 70 comprises bayonet mount pawl portions 70a and mount opening portions 70c disposed alternately.

Summing up the above-described dimensional relations, the camera system is constructed such that E>G>D>F and B+F>A and C+G>A and
E>I>D>L and M+L>A and J+I>A and
H>G>K>F.

(Possibility and Impossibility of Mounting)

Description will now be made of the possibility and impossibility of the mounting of the first or second camera body and the first or second interchangeable lens of the camera system according to the present embodiment.

Figure 9:
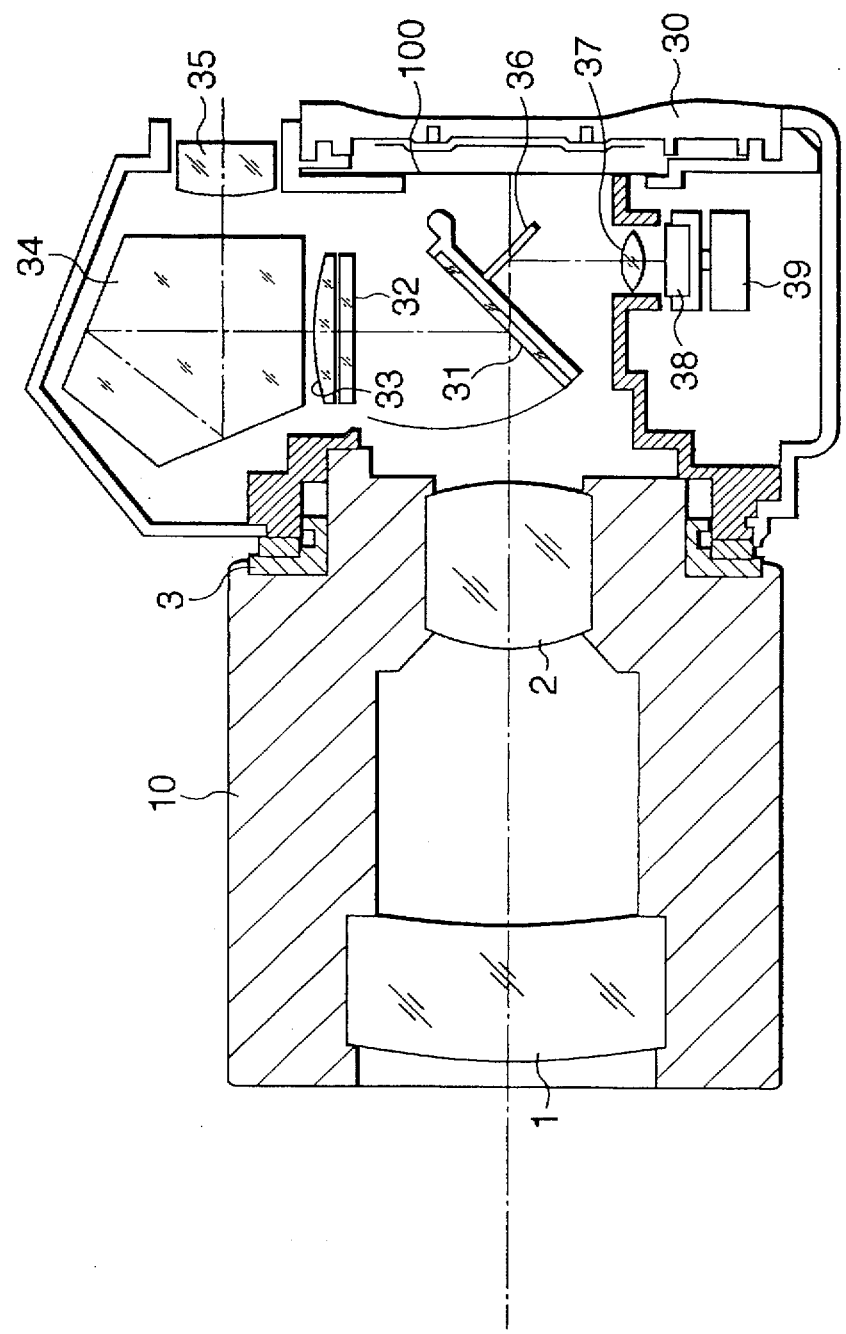
FIG. 9 is a cross-sectional view showing a case where the first camera body and the first intermediate lens according to the embodiment are coupled together.

The first interchangeable lens 10 is short in its back focus B, but the first camera body 30 is mountable on all the interchangeable lenses and therefore, as shown in FIG. 9, the first interchangeable lens 10 can be mounted on the first camera body 30.

When the first interchangeable lens 10 and the first camera body 30 are mounted, a light beam passes through photo-taking lenses 1 and 2 and a part thereof is reflected by a quick return mirror 31 having a semi-transmitting portion and enters a finder optical system, and arrives at a photographer's eye via a focusing screen 32, a condenser lens 33, a pentagonal prism 34 and an eyepiece 35.

On the other hand, the remainder of the light beam passes through the semi-transmitting portion of the mirror 31 and enters a light receiving element 38 via a reflecting mirror 36 and a lens 37, and by the use of the output of this light receiving element 38, the judgment of in-focus is done by a focus detection circuit 39. These are known techniques and therefore need not be described any further.

Figure 10:
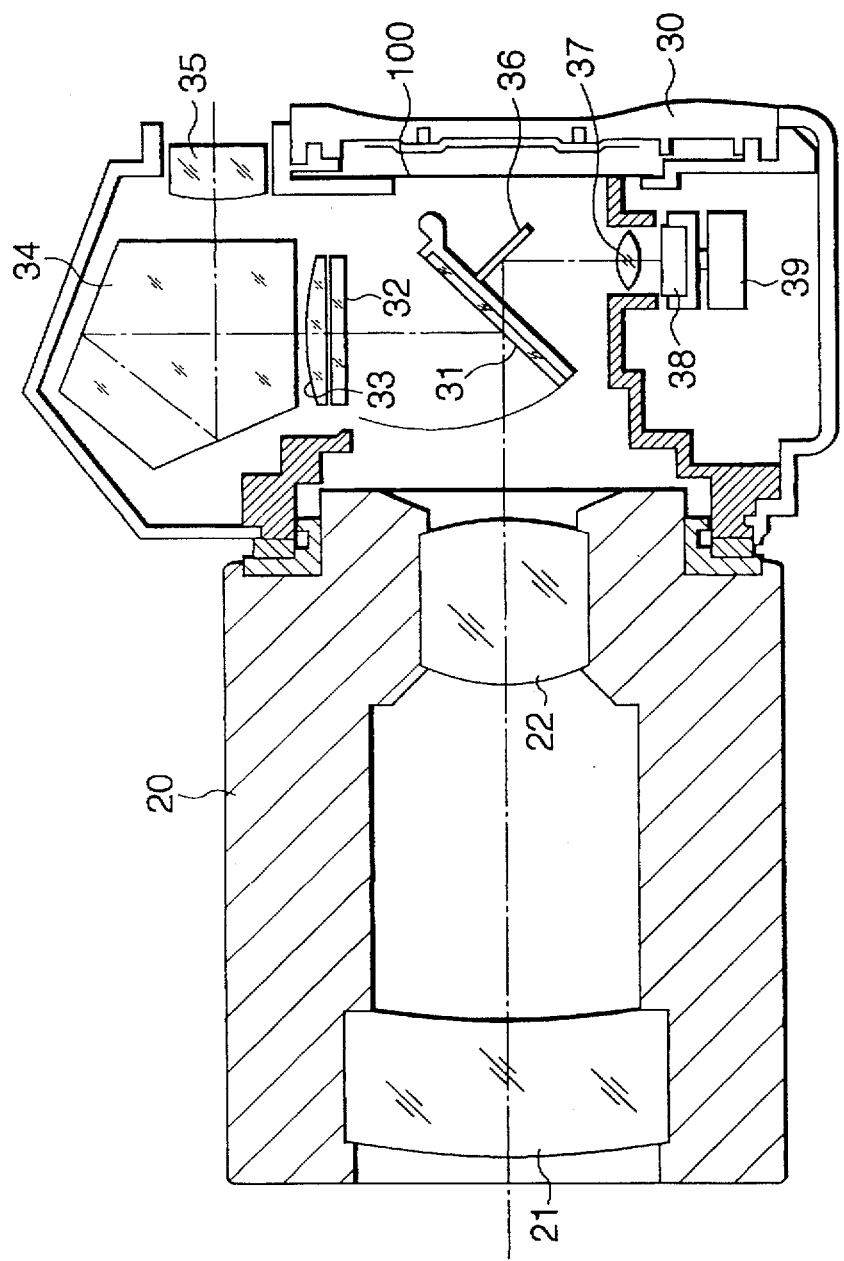
FIG. 10 is a cross-sectional view showing a case where the first camera body and the second intermediate lens according to the embodiment are coupled together.

The second interchangeable lens 20 is long in its back focus and the second body 30 is mountable on all the interchangeable lenses and therefore, as shown in FIG. 10, the second interchangeable lens 20 can be mounted on the first camera body 30.

Figure 11:
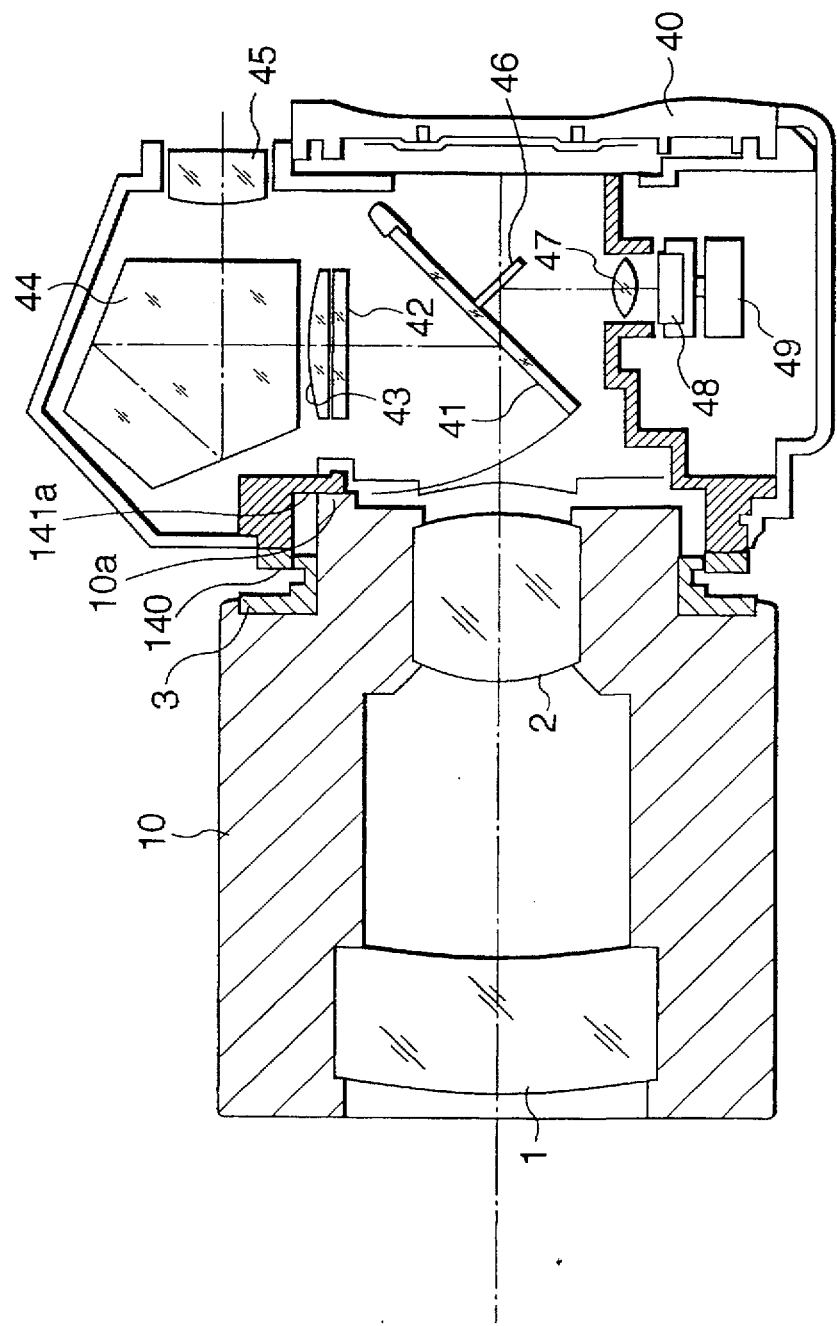
FIG. 11 is a cross-sectional view showing a case where the second camera body and the first intermediate lens according to the embodiment are coupled together.

Here, the first interchangeable lens 10 is short in its back focus and the second body 40 permits only the mounting of interchangeable lenses having a predetermined or greater back focus and therefore, as shown in FIG. 11, the projected portion 10a of the rear end portion of the first interchangeable lens 10 and the flat flange portion 141a of the rear of the body mount 140 of the second body 40 interfere with each other. Thus, in the case of a combination of the first interchangeable lens 10 and the second camera body 40, mounting is impossible even if their mount shapes are the same.

Figure 12:
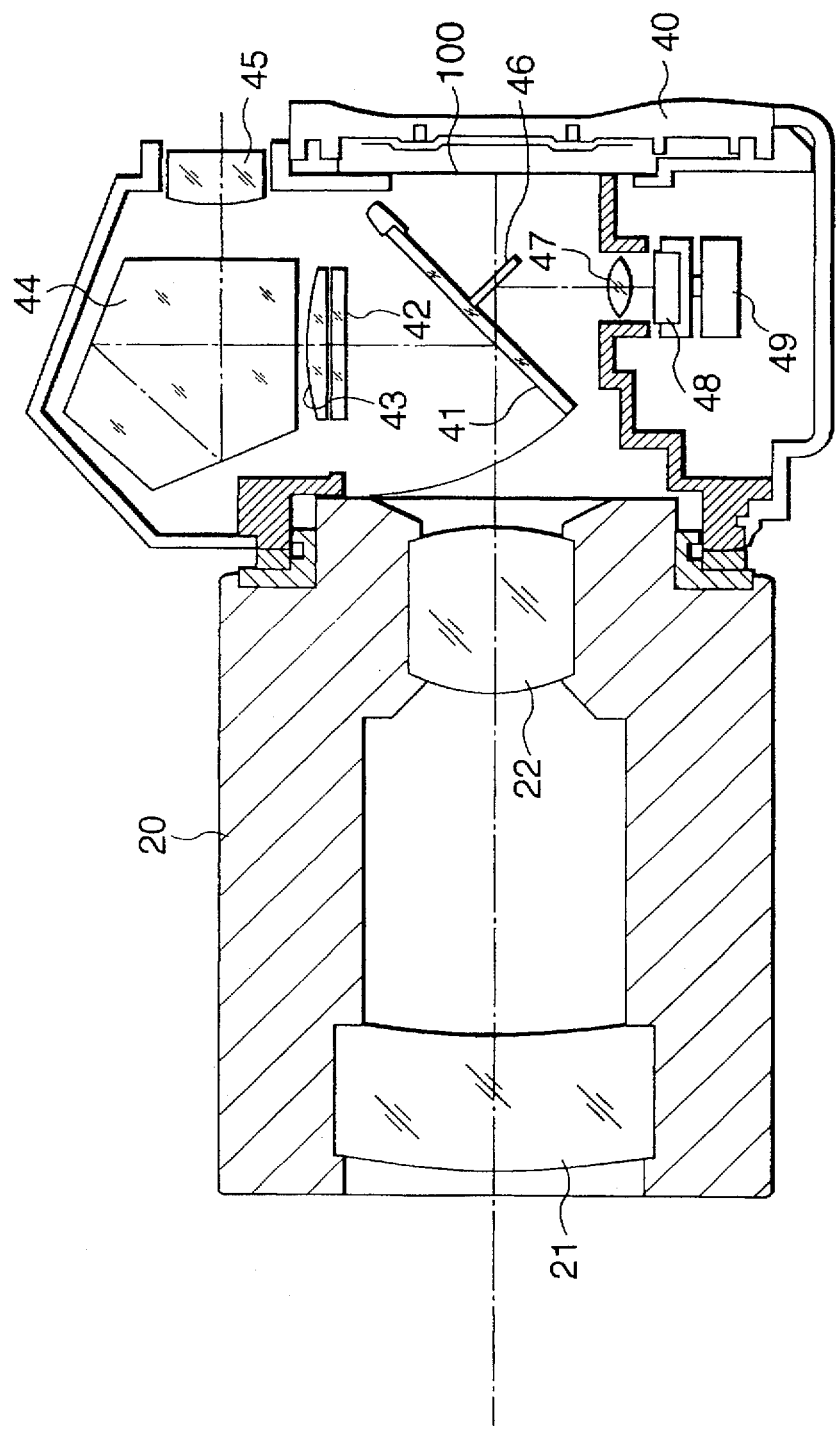
FIG. 12 is a cross-sectional view showing a case where the second camera body and the second intermediate lens according to the embodiment are coupled together.

The second interchangeable lens 20 is long in its back focus and the second body 40 permits only the mounting of interchangeable lenses having a predetermined or greater back focus and therefore, as shown in FIG. 12, the second interchangeable lens 20 can be mounted on the second body 40.

(Other Embodiment of First Interchangeable Lens)

Figure 19A:
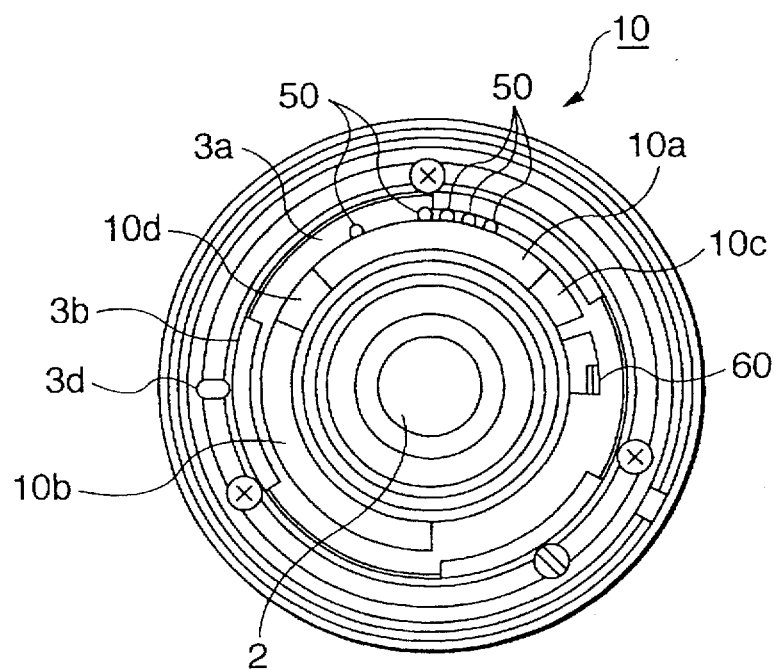
FIGS. 19A and 19B show another embodiment of the first interchangeable lens.
Figure 19B:
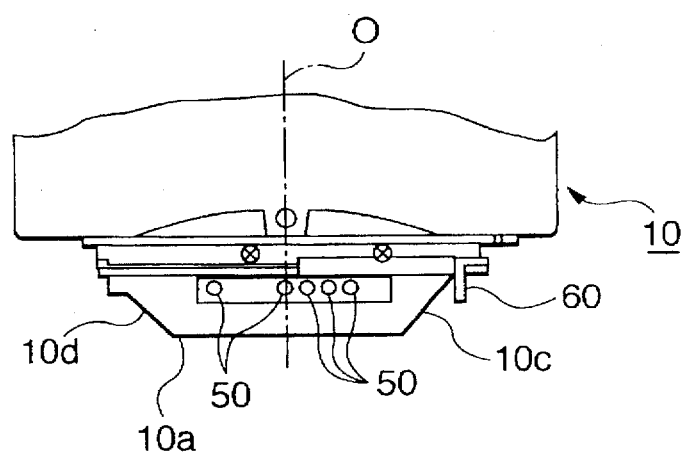

FIG. 19A is a view of another embodiment of the interchangeable lens 10 as it is seen from the rear of the lens side mount 3. FIG. 19B is a side view showing portions of another embodiment of the interchangeable lens 10.

In the following description, the same members as those in the first embodiment will be described with the same reference characters given thereto and the detailed description thereof will be omitted.

The interchangeable lens 10 is provided with an electrical contact 50 connected to an electrical contact on the camera body 30 side for effecting the supply of a power source and the communication of information. As shown, a fixed projection 10a is provided around the optical axis 0 of the interchangeable lens 10 so as to surround the electrical contact 50. Specifically, the fixed projection 10a is provided in a counter-clockwise direction from the upper portion of a stop lever 60 to the upper portion of a mounting and dismounting groove 3d (a range of about ±40° with respect to right above the optical system 2 about the optical axis 0 as viewed in FIG. 19A) so as not to interfere with the stop lever 60 and the mounting and dismounting groove 3d.

Thereby, the electrical contact 50 can be protected by the fixed projection 10a when the first interchangeable lens 10 is mounted on the first camera body 30. Also, other members can be prevented from contacting and injuring the electrical contact 50 when the first interchangeable lens 10 is carried or taken into custody.

The fixed projection 10a can be provided with inclined surfaces 10c and 10d on the opposite ends thereof about the optical axis 0. Thereby, the inclined surfaces 10c and 10d alleviate the contact of the stop lever 60 and constituents in the first camera body 30 and prevent these members from being injured when the first interchangeable lens 10 is mounted on the first camera body 30. Also, when an attempt is made to mount the first interchangeable lens 10 on body side mounts 130 and 140 in eccentric relationship with the latter, the inclined surfaces can prevent the stop lever 60 and the constituents in the first camera body 30 from being injured when the lens side mount 3 of the first interchangeable lens 10 is turned in a direction opposite to that during ordinary mounting or when the first interchangeable lens 10 is mounted on the first camera body 30 or the second camera body 40 at a position differing from a regular position.

The present invention is not restricted to the above-described embodiments, but various modifications and changes are possible and they are also within the scope of the present invention.

For example, the camera system of the present embodiment may include other interchangeable lens units having different back focuses.

As described above, according to the present invention, the first camera body is designed to escape in the interior of the body side mount over the mounting range of the interchangeable lens to thereby make the mounting of all the interchangeable lenses possible, and the second camera body is designed such that when an attempt is made to mount an interchangeable lens having a back focus shorter than a predetermined back focus, the flange portion and the fixed member interfere with each other to thereby hamper mount coupling and therefore, various kinds of interchangeable lenses are usable to the first camera body, and this means great merit to users.

On the other hand, to manufacturers, such lenses of a back focus that cannot be mounted on conventional cameras are provided whereby although camera bodies are not free from some limitations, cameras corresponding to lenses of a short back focus are prepared, whereby the development of lenses which have heretofore been considered to be impossible in specification becomes possible.

(Possibility and Impossibility of the Mounting of Intermediate Adapters)

Description will now be made of the possibility and impossibility of the mounting of the first or second camera body, the first or second interchangeable lens and the first or second intermediate adapter of the camera system according to the present embodiment.

FIG. 1 is a cross-sectional view showing a case where the first camera body, the first intermediate adapter and the first interchangeable lens according to the present embodiment are coupled together.

The first body 30 permits the mounting of all the interchangeable lenses and all the intermediate adapters, and the intermediate adapter 50 permits the mounting of all the interchangeable lenses.

Accordingly, the first intermediate adapter 50 can be mounted between the first interchangeable lens 10 and the first camera body 30.

When the first interchangeable lens 10, the first intermediate adapter 50 and the first camera body 30 are mounted, the light beam passes through the photo-taking lens 1 and 2 and the optical system 51, and a part of the light beam is reflected by the quick return mirror 31 having a semi-transmitting portion and enters the finder optical system, and arrives at the photographer's eye via the focusing screen 32, the condenser lens 33, the pentagonal prism 34 and the eyepiece 35.

On the other hand, the remainder of the light beam passes through the semi-transmitting portion of the mirror 31 and enters the light receiving element 38 via the reflecting mirror 36 and the lens 37, and by the use of the output of this light receiving element 38, the judgment of in-focus is done by the focus detection circuit 39. These are known techniques and therefore need not be described any further.

Figure 2:
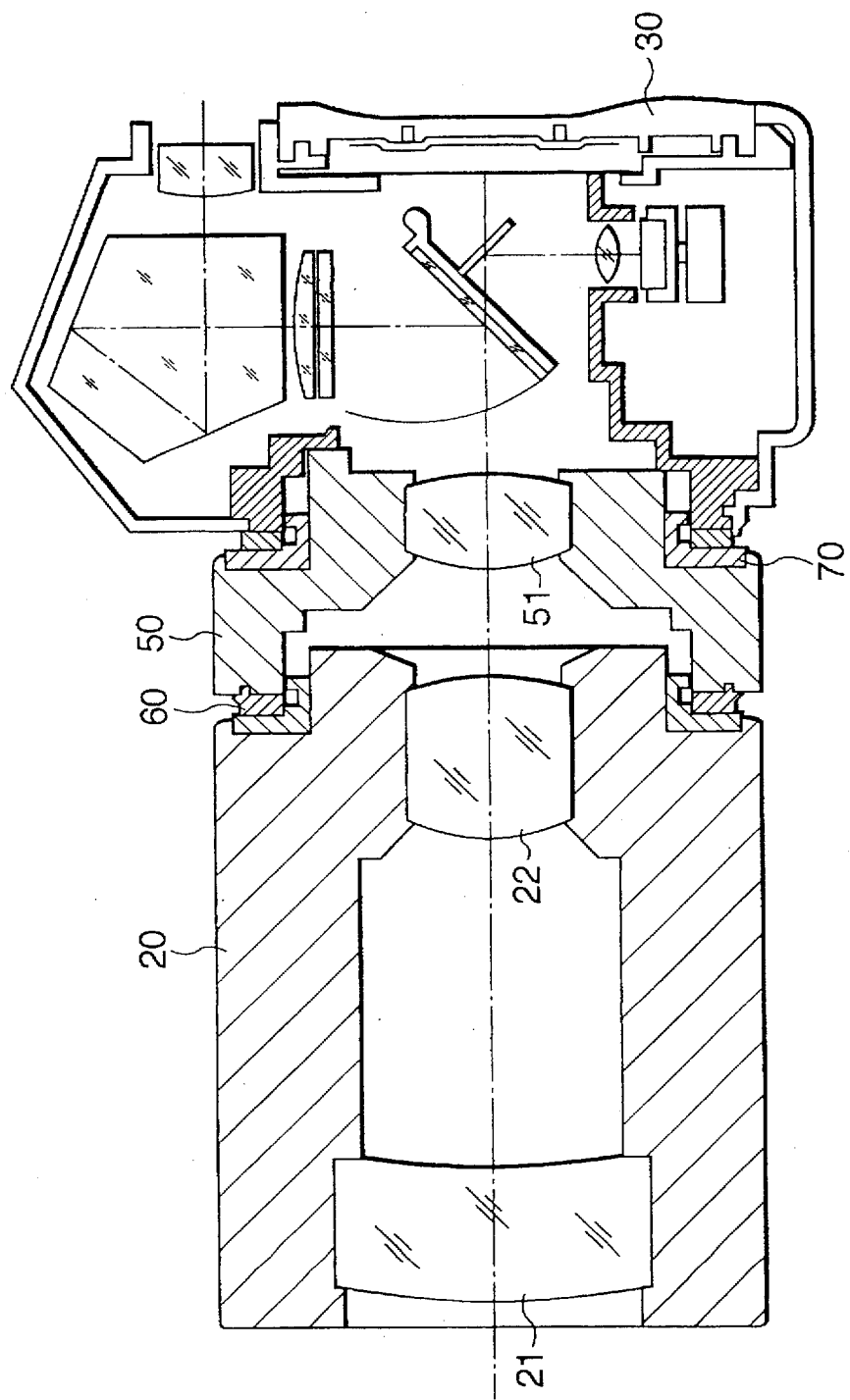
FIG. 2 is a cross-sectional view showing a case where the first camera body, the first intermediate adapter and a second interchangeable lens according to the embodiment are coupled together.

FIG. 2 is a cross-sectional view showing a case where the first camera body, the first intermediate adapter and the second interchangeable lens according to the present embodiment are coupled together.

The first body 30 permits the mounting of all the interchangeable lenses and all the intermediate adapters, and the intermediate adapter 50 permits the mounting of all the interchangeable lenses.

Accordingly, the first intermediate adapter 50 can be mounted between the second interchangeable lens 20 and the first camera body 30.

Figure 3:
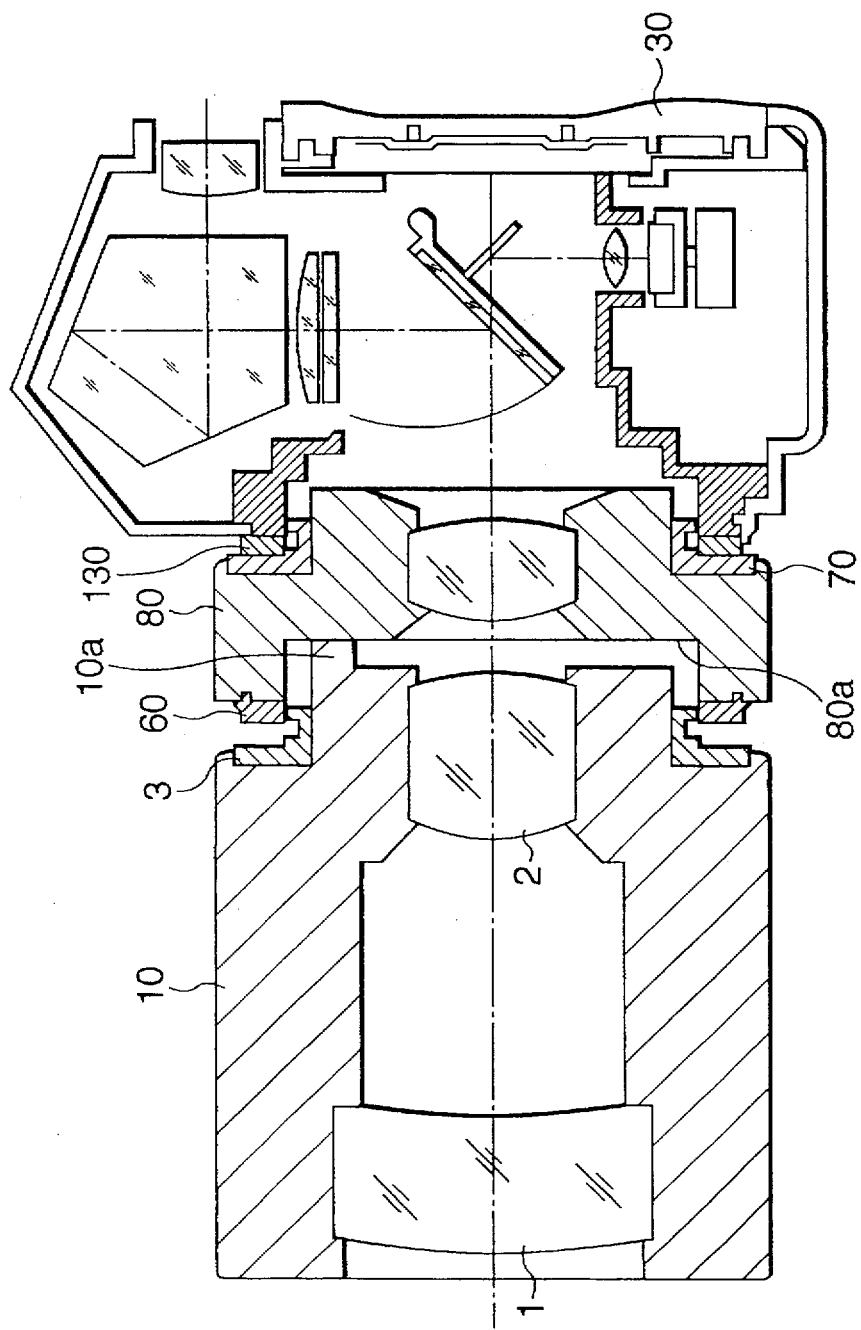
FIG. 3 ms a cross-sectional view showing a case where the first camera body, a second intermediate adapter and the first interchangeable lens according to the embodiment are coupled together.

FIG. 3 is a cross-sectional view showing a case where the first camera body, the second intermediate adapter and the first interchangeable lens according to the present embodiment are coupled together.

The first camera body 30 permits the mounting of all the interchangeable lenses and all the intermediate adapters, and the second intermediate adapter 80 is mountable only on an interchangeable lens having a predetermined or greater back focus. Also, the first interchangeable lens 10 is an interchangeable lens short in its back focus.

In this case, the projection 10a provided on the inner diameter portion of the mount of the first interchangeable lens 10 and the front side flange portion 80a of the intermediate adapter 80 interfere with each other, whereby the mounting of the first interchangeable lens 10 and the second intermediate adapter 80 is prevented.

Accordingly, the second intermediate adapter 80 does not permit the first interchangeable lens 10 to be mounted thereon.

Figure 4:
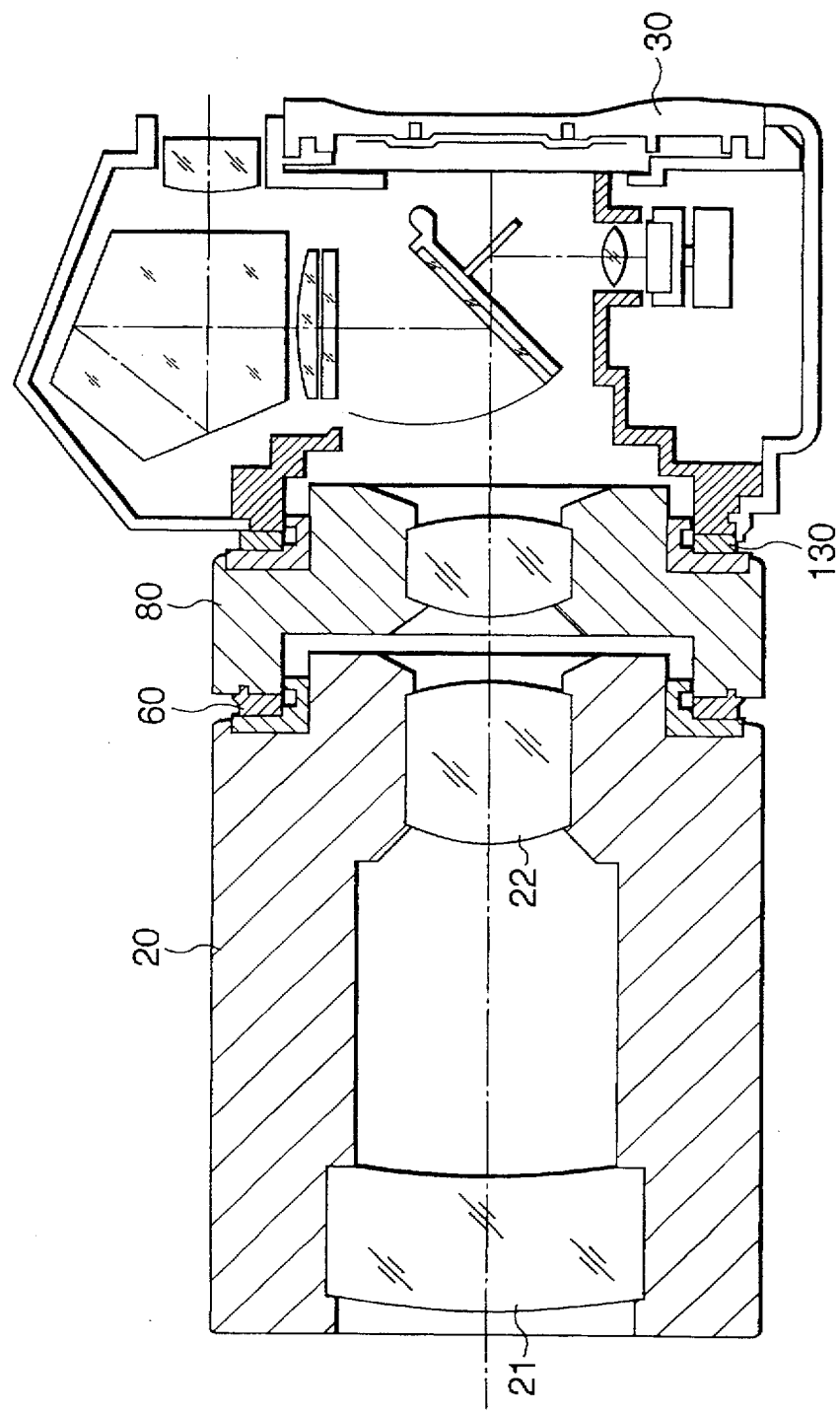
FIG. 4 ms a cross-sectional view showing a case where the first camera body, the second intermediate adapter and the second interchangeable lens according to the embodiment are coupled together.

FIG. 4 is a cross-sectional view showing a case where the first camera body, the second intermediate adapter and the second interchangeable lens according to the present embodiment are coupled together.

The second intermediate adapter 80 is mountable only on an interchangeable lens having a predetermined or greater back focus, and the second interchangeable lens 20 is a lens long in its back focus.

Accordingly, the second intermediate adapter 80 can be mounted between the second interchangeable lens 20 and the first camera body 30.

Figure 5:
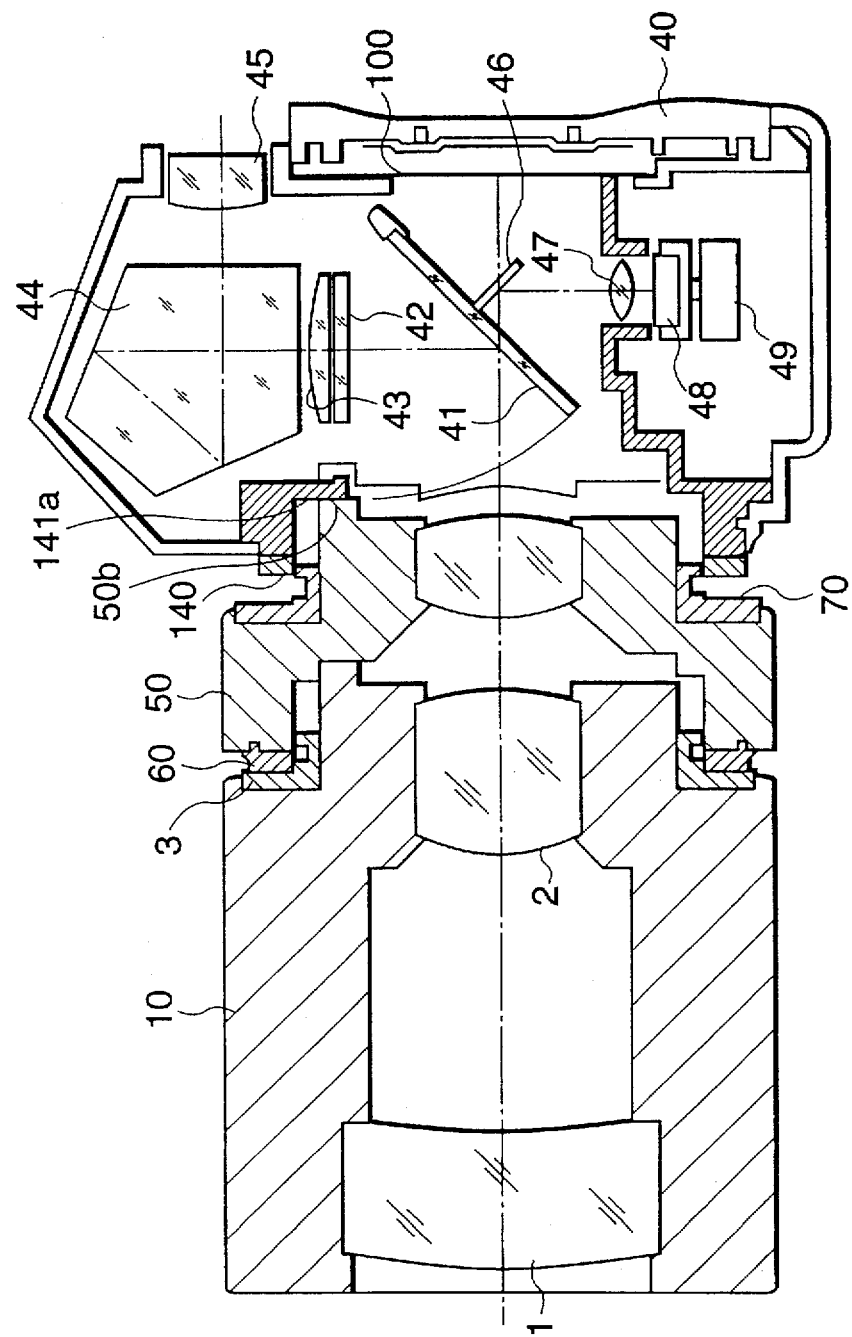
FIG. 5 is a cross-sectional view showing a case where a second camera body, the first intermediate adapter and the first interchangeable lens according to the embodiment are coupled together.

FIG. 5 is a cross-sectional view showing a case where the second camera body, the first intermediate adapter and the first interchangeable lens according to the present embodiment are coupled together.

The first interchangeable lens 10 is a lens short in its back focus, and the first intermediate adapter 50 is an adapter on which all the interchangeable lenses are mountable. Also, the first body 40 permits only the mounting of an interchangeable lens having a predetermined or greater back focus and an intermediate adapter mountable thereon.

In this case, the projected portion 50b of the rear end portion of the first intermediate adapter 50 and the flat flange portion 141a of the rear of the body mount 140 interfere with each other and therefore, the first intermediate adapter 50 cannot be mounted on the mount of the second camera body 40.

Figure 6:
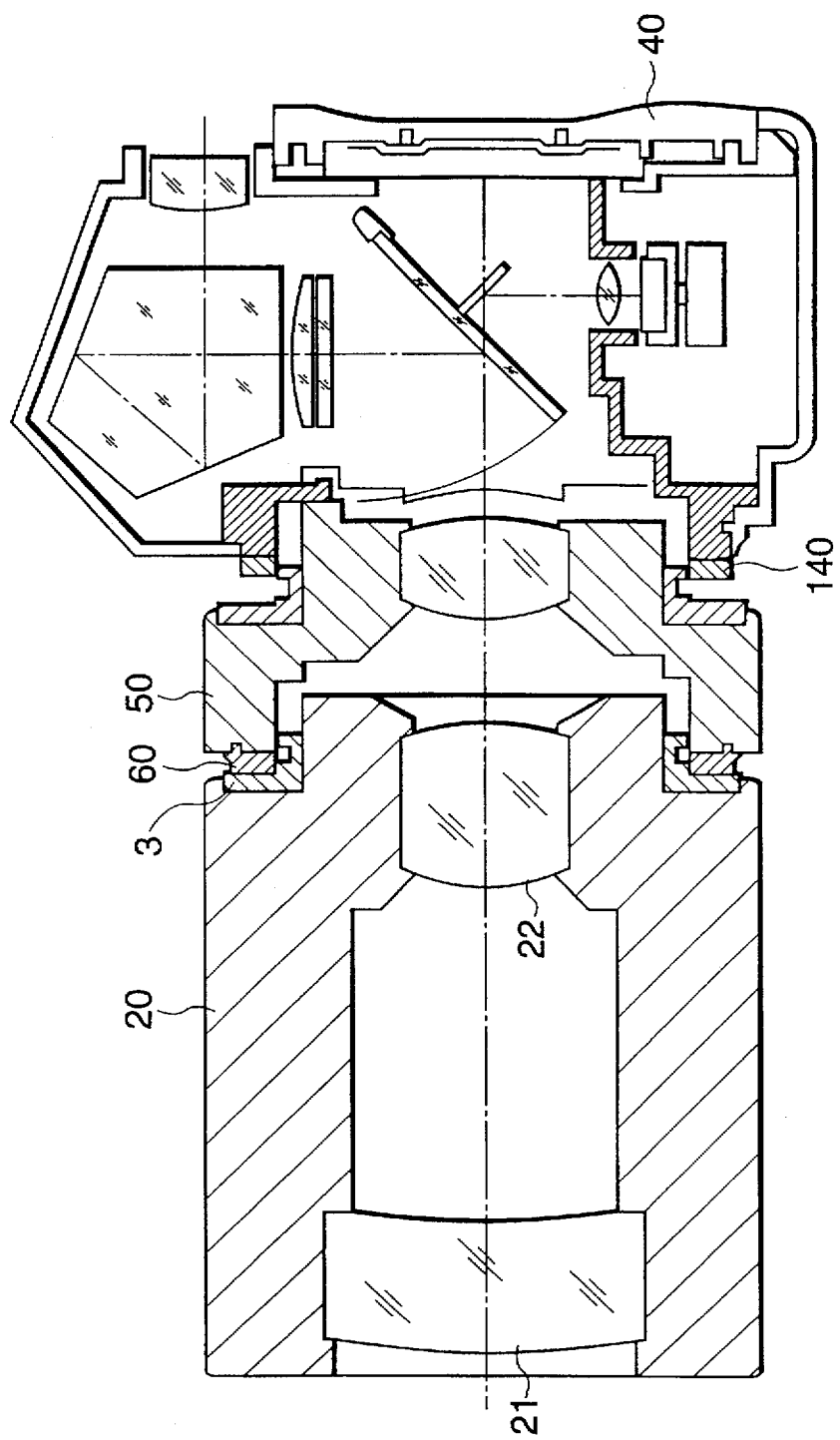
FIG. 6 is a cross-sectional view showing a case where the second camera body, the first intermediate adapter and the second interchangeable lens according to the embodiment are coupled together.

FIG. 6 is a cross-sectional view showing a case where the second camera body, the first intermediate adapter and the second interchangeable lens according to the present embodiment are coupled together.

The second camera body 40 is a body permitting only the mounting of an interchangeable lens having a predetermined or greater back focus and an intermediate adapter permitting the mounting of that interchangeable lens, and the intermediate adapter 50 is an adapter permitting the mounting of all the interchangeable lenses. On the other hand, the second interchangeable lens 20 is a lens long in its back focus.

Accordingly, the first intermediate adapter 50, as in the case of FIG. 5, cannot be mounted on the second camera body 40.

Figure 7:
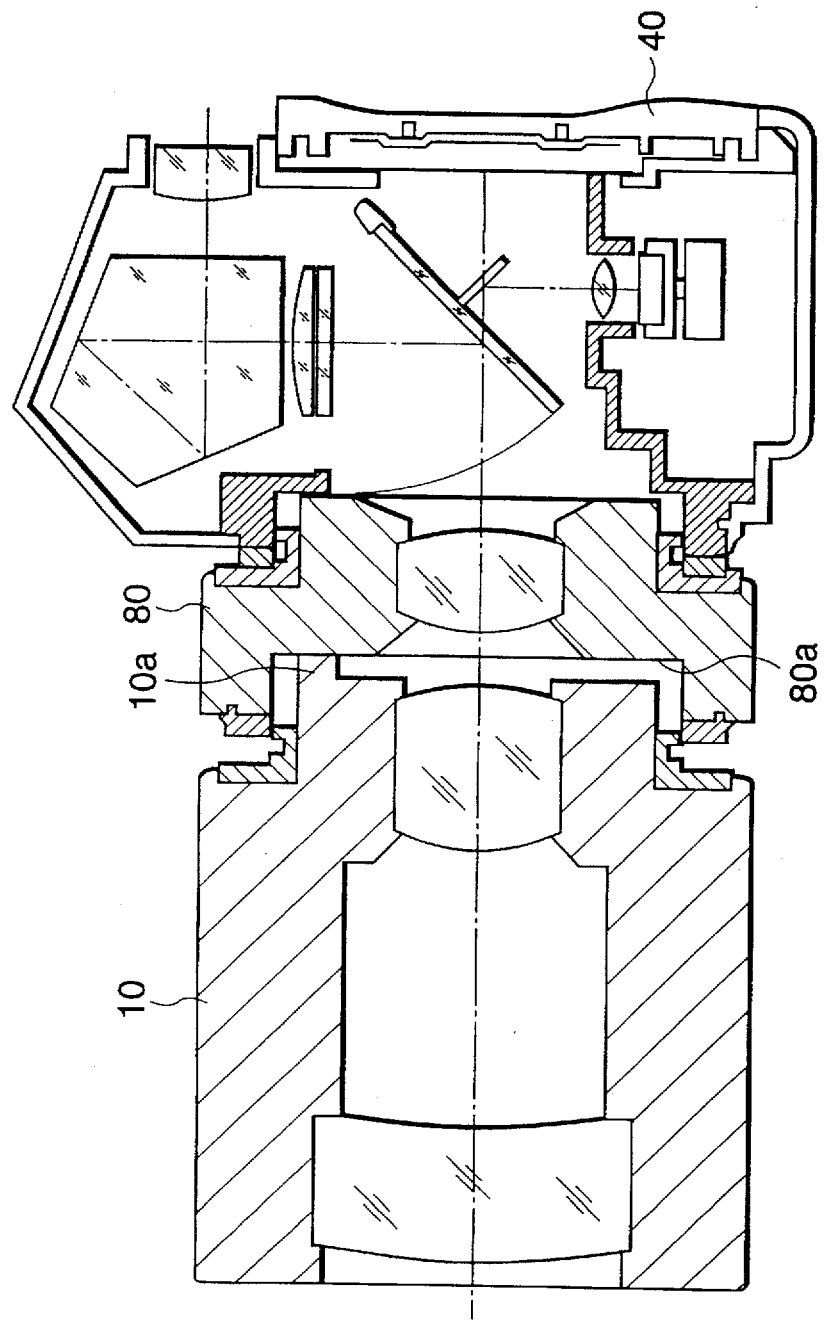
FIG. 7 is a cross-sectional view showing a case where the second camera body, the second intermediate adapter and the first interchangeable lens according to the embodiment are coupled together.

FIG. 7 is a cross-sectional view showing a case where the second camera body, the second intermediate adapter and the first interchangeable lens according to the present embodiment are coupled together.

The intermediate adapter 80 is an adapter mountable only on an interchangeable lens having a predetermined or greater back focus. The interchangeable lens 10 is a lens short in its back focus. Also, the second camera body 40 is a body permitting only the mounting of an interchangeable lens having a predetermined or greater back focus and an intermediate adapter permitting the mounting of that interchangeable lens.

In this case, the projection 10a provided on the inner diameter portion of the mount of the first interchangeable lens 10 and the front side flange portion 80a of the second intermediate adapter 80 interfere with each other, whereby the mounting of the first interchangeable lens 10 and the second intermediate adapter 80 is prevented.

Accordingly, the second intermediate adapter 80 is mountable on the second camera body 40, but does not permit the first interchangeable lens 10 to be mounted thereon.

Figure 8:
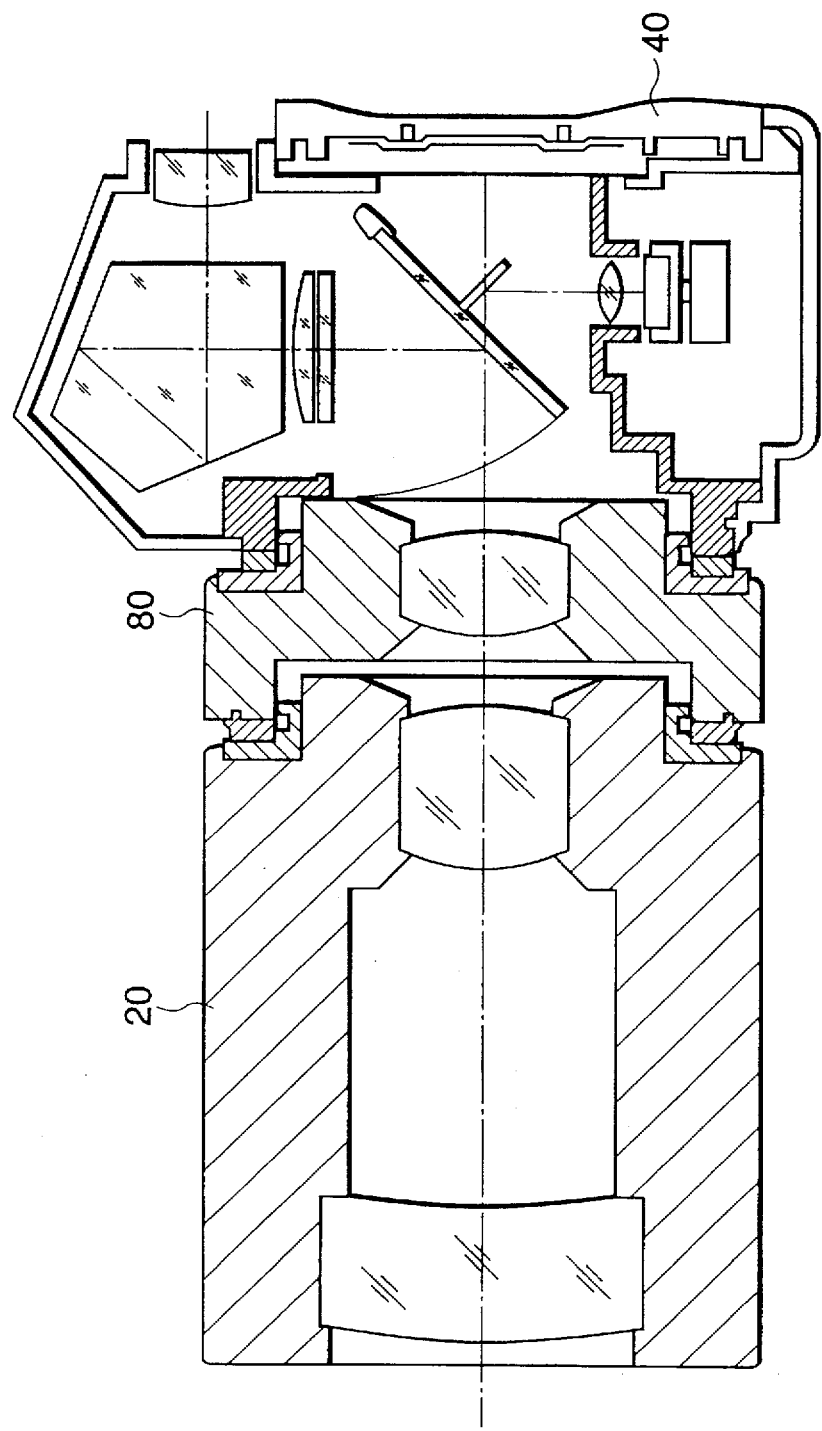
FIG. 8 is a cross-sectional view showing a case where the second camera body, the second intermediate adapter and the second interchangeable lens according to the embodiment are coupled together.

FIG. 8 is a cross-sectional view showing a case where the second camera body, the second intermediate adapter and the second interchangeable lens according to the present embodiment are coupled together.

The second interchangeable lens 20 is a lens long in its back focus, and the second intermediate adapter 80 is an adapter mountable only on an interchangeable lens having a predetermined or greater back focus.

Accordingly, the second intermediate adapter 80 can be mounted between the second intermediate lens 20 and the second camera body 40.

FIG. 9 is a cross-sectional view showing a case where the first camera body and the first interchangeable lens according to the present embodiment are coupled together.

The first interchangeable lens 10 is short in its back focus B, but the first camera body 30 are mountable on all the interchangeable lenses and therefore, the first interchangeable lens 10 can be mounted on the camera body 30.

FIG. 10 is a cross-sectional view showing a case where the first camera body and the second interchangeable lens according to the present embodiment are coupled together.

The second interchangeable lens 20 is long in its back focus and the first body 30 is mountable on all the interchangeable lenses and therefore, the second interchangeable lens 20 can be mounted on the first camera body 30.

FIG. 11 is a cross-sectional view showing a case where the second camera body and the first interchangeable lens according to the present embodiment are coupled together.

The first interchangeable lens 10 is short in its back focus and the second body 40 permits only the mounting of an interchangeable lens having a predetermined or greater back focus and therefore, the projected portion 10a of the rear end portion of the first interchangeable lens 10 and the flat flange portion 141a of the rear of the body mount 140 of the second body 40 interfere with each other.

Accordingly, in the combination of the first interchangeable lens 10 and the second camera body 40, mounting becomes impossible even if the shapes of the mounts thereof are the same.

FIG. 12 is a cross-sectional view showing a case where the second camera body and the second interchangeable lens according to the present embodiment are coupled together.

The second interchangeable lens 20 is long in its back focus and the second body 40 permits only the mounting of an interchangeable lens having a predetermined or greater back focus and therefore, the second interchangeable lens 20 can be mounted on the second body 40.

Accordingly, in the combinations of FIGS. 3, 5, 6, 7 and 11, mounting is impossible even if the shapes of the mounts are the same.

(Other Embodiment of First Intermediate Adapter)

Figure 20A:
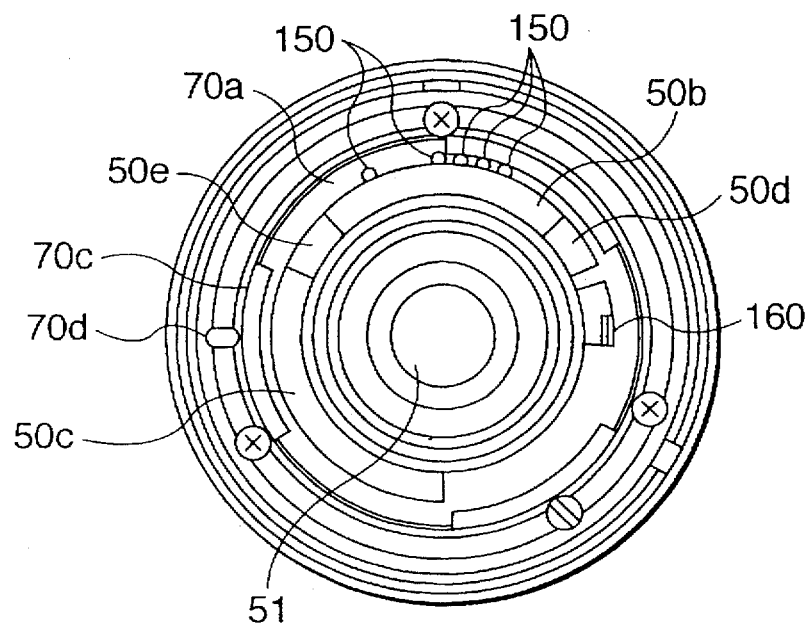
FIGS. 20A and 20B show another embodiment of the first intermediate adapter.
Figure 20B:
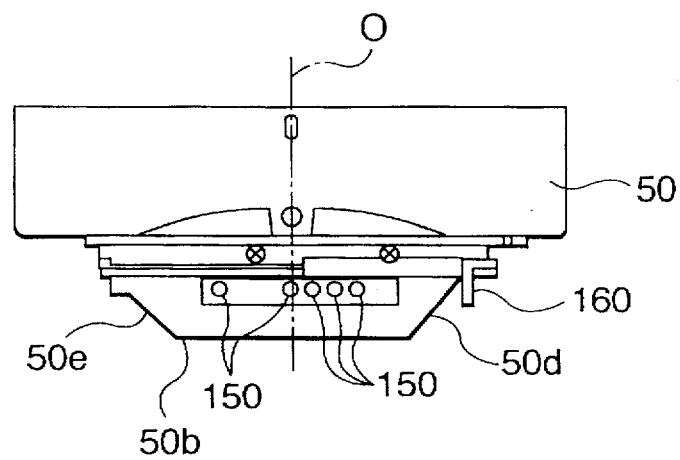

FIG. 20A is a view of another embodiment of the first intermediate adapter 50 as it is seen from the rear of a body coupling mount 70. FIG. 20B is a side view showing portions of the first intermediate adapter 50 which is another embodiment.

The first intermediate adapter 50 is provided with an electrical contact 150 connected to an electrical contact on the camera body 30 side for effecting the supply of the power source and the communication of information, and a fixed projection 50b is provided around the optical axis 0 so as to surround the electrical contact 150. Specifically, the fixed projection 50b is provided in a counter-clockwise direction from the upper portion of a stop lever 160 to the upper portion of a mounting and dismounting groove 70d (a range of about ±40° with respect to right above the optical system 2 about the optical axis 0 as viewed in FIG. 20A) so as not to interfere with the stop lever 160 and the mounting and dismounting groove 70d.

Thus, the electrical contact 150 can be protected by the fixed projection 50b when the first intermediate adapter 50 is mounted on the first camera body 30. Also, any other member can be prevented from contacting with and injuring the electrical contact 150 when the first intermediate adapter 50 is carried or taken into custody.

The fixed projection 50b is provided with inclined surfaces 50d and 50e on the opposite ends thereof about the optical axis 0. Thereby, the inclined surfaces 50d and 50e alleviate the contact with the stop lever 160 and constituents in the interior of the first camera body 30 and prevent these members from being injured when the first intermediate adapter 50 is mounted on the first camera body 30. When the body coupling mount 70 of the first intermediate adapter 50 is turned in a direction opposite to that during ordinary mounting, the stop lever 160 and the constituents in the interior of the first camera body 30 can be prevented from being injured when an attempt is made to mount the first intermediate adapter 50 on the first camera body 30 or the second camera body 40 at a position differing from the regular position.

The present invention is not restricted to the above-described embodiments, but various modifications and changes are possible and they are also within the scope of the present invention.

For example, the camera system of the present embodiment may include other interchangeable lens units differing in back focus.

Also, the intermediate adapters of the present embodiment are applied to a tele-converter, but the present invention can be carried out in combinations of other intermediate adapters such as intermediate rings or bellows for close-up photographing, the camera bodies and the interchangeable lenses.

As described above, according to the present invention, the first camera body has an escape portion in the body side mount over the mounting range of the interchangeable lens or the intermediate adapter so that the mounting of all the interchangeable lenses and all the intermediate adapters may be possible, the second camera body is provided with a flange portion in the body side mount so that the mounting of an interchangeable lens having a predetermined or greater back focus and an intermediate adapter mountable only on this interchangeable lens may be possible, and an interchangeable lens having a back focus shorter than a predetermined back focus and a particular intermediate adapter are provided with a fixed member for interfering with the flange portion in the body side mount to thereby hamper the engagement of the mount when an attempt is made to mount them on the second camera body and therefore, the first camera body can use various kinds of interchangeable lenses and intermediate adapters, and this means great merit to users.

On the other hand, to manufacturers, such lenses of a back focus and intermediate adapters that cannot be mounted on conventional cameras are provided, whereby although camera bodies are not free from some limitations, cameras corresponding to lenses of a short back focus and particular intermediate adapters are prepared, whereby the development of interchangeable lenses and intermediate adapters which have heretofore been considered to be impossible in specification becomes possible.

What is claimed is:

1. A camera system, comprising:
   first and second camera bodies including metal backs, having identical measurements from a mount reference surface to a film surface and having body side mounts of identical shape; and
   a plurality of interchangeable lens units having a common lens side mount engageable with said body side mounts,
   said first camera body including an escape portion over a mounting range of the interchangeable lens units in an interior of said body side mount so that individual mounting of all the interchangeable lens units is possible, and
   said second camera body including a flange portion in the interior of said body side mount so that only an interchangeable lens unit having a back focus of a predetermined or larger dimension may be mountable thereto.

2. The camera system of claim 1, wherein said interchangeable lens units include a selective mount lens unit having a back focus of a predetermined or smaller dimension and provided with a fixed member for interfering with said flange portion in said body side mount of said second camera body when an attempt is made to mount said selective mount unit on said second camera body, and hampering mount coupling.

3. The camera system of claim 2,
   wherein said selective mount lens unit includes an optical system, and
   wherein said fixed member is a fixed projection provided between said lens side mount and said optical system.

4. The camera system of claim 3,
   wherein said body side mount includes a body side electrical contact, and
   wherein said fixed projection is a protective member for protecting a lens side electrical contact connectable to said body side electrical contact provided on said body side mount.

5. The camera system of claim 4,
   wherein at least one of said first or second camera bodies includes a constituent member, and
   wherein said protective member is provided with shock absorbing portions for absorbing shock of contact with said constituent member when said interchangeable lens units are mounted on said first or second camera body.

6. A camera body for use in a camera system having camera bodies with identical measurements from a mount reference surface to a film surface and body side mounts of identical shapes, and interchangeable lens units, each having a common lens side mount engageable with said body side mounts, said body comprising:
   a metal back; and
   body side mounts having an interior with an escape portion over a mounting range of the interchangeable lens units so that mounting of all the interchangeable lens units is possible.

7. An interchangeable lens for use in a camera system having a predetermined or shorter back focus, said interchangeable lens being attachable to one of a plurality of camera bodies having identical measurements from a mount reference surface to a film surface and body side mounts of identical shapes and including a flange portion, said interchangeable lens comprising:
   a common lens side mount engageable with the body side mounts; and
   a fixed member interfering with the flange portion of the body side mount to which only interchangeable lenses having a predetermined or longer back focus are mountable.

8. The interchangeable lens of claim 7,
   further comprising an optical system, and
   wherein said fixed member is a fixed projection provided between said lens side mount and said optical system.

9. The interchangeable lens of claim 8, wherein at least one of the body side mounts includes a body side electrical contact,
   wherein said interchangeable lens further comprises a lens side electrical contact connectable to the body side electrical contact, and
   wherein said fixed projection is a protective member for said lens side electrical contact.

10. The interchangeable lens of claim 9, wherein said camera body includes a constituent member, and wherein said protective member is provided with a shock absorbing portion for absorbing shock of contact with said constituent member when said interchangeable lens is mounted on one of the camera bodies.

11. A camera system comprising:

first and second camera bodies including metal backs, having identical measurements from a mount reference surface to a film surface and having body side mounts of identical shape;

a plurality of interchangeable lenses each having a common lens side mount engageable with one of said body side mounts; and a plurality of intermediate adapters connectable between said camera bodies and said interchangeable lenses, said first camera body including an escape portion in said body side mount over a mounting range of the interchangeable lenses and the intermediate adapters so that the mounting of any of the interchangeable lenses and any of the intermediate adapters is possible, and said second camera body including a flange portion in said body side mount so that the mounting of selected interchangeable lenses having a predetermined or greater back focus and the mounting of any intermediate adapter mountable only on the selected interchangeable lenses is possible.

12. The camera system of claim 11, wherein a first intermediate adapter is mountable on all the interchangeable lenses and a second intermediate adapter is provided with a fixed member adapted to interfere with said flange portion in said body side mount of said second camera body during mounting to thereby hamper mount coupling when an attempt is made to mount said interchangeable lenses on said second camera body.

13. The camera system of claim 12, wherein said second intermediate adapter includes a body coupling mount, and wherein said fixed member is a fixed projection provided on an inner diameter side of the body coupling mount of said second intermediate adapter.

14. The camera system of claim 13, wherein at least one of the body side mounts includes a body side electrical contact, wherein said interchangeable lens further comprises an intermediate side electrical contact connectable to said body side electrical contact, and wherein said fixed projection is a protective member for said intermediate side electrical contact.

15. The camera system of claim 14, wherein said camera body includes a constituent member, and wherein said protective member is provided with shock absorbing portions for absorbing shock of contact with said constituent member when said intermediate adapter is mounted on one of said camera bodies.

16. An intermediate adapter for use in a camera system including interchangeable lenses, and a camera body, said intermediate adapter comprising camera and lens mounts to mount the interchangeable lenses to the camera body; and a fixed member, the camera body having a flange portion in a body side mount restricting mounting to only selected interchangeable lenses having a predetermined or greater back focus, said intermediate adapter being mountable on all the interchangeable lenses, but said fixed member is adapted to interfere with the flange portion in the body side mount to thereby hamper mount coupling when an attempt is made to mount said intermediate adapter on the camera body.

17. The intermediate adapter of claim 16, wherein said intermediate adapter is a tele-converter having an optical system.

18. The intermediate adapter of claim 17, wherein said fixed member is a fixed projection provided between said camera mount of said intermediate adapter and said optical system.

19. The intermediate adapter of claim 18, wherein at least one of the body side mounts includes a body side electrical contact, wherein said interchangeable lens further includes an intermediate adapter side electrical contact connectable to said body side electrical contact, and wherein said fixed projection is a protective member for said intermediate side electrical contact.

20. The intermediate adapter of claim 19, wherein said camera body includes a constituent member, and wherein said protective member is provided with a shock absorbing portion for absorbing shock of contact with said constituent member when said intermediate adapter is mounted on said camera body.

21. The intermediate adapter of claim 16, wherein said intermediate adapter includes an optical system, and wherein said fixed member is a fixed projection provided between said camera mount of said intermediate adapter and said optical system.

* * * * *